United States Patent
Sato et al.

(10) Patent No.: US 7,453,487 B2
(45) Date of Patent: Nov. 18, 2008

(54) OPTICAL SCANNING APPARATUS HAVING SCANNING LINE CURVATURE CORRECTING MECHANISM WITH SLIDING PRESSURE POINT ALONG A LONGITUDINAL DIRECTION OF THE OPTICAL ELEMENT

(75) Inventors: Masaki Sato, Numazu (JP); Ken-Ichi Tomita, Mishima (JP); Akihiro Fukutomi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/319,099

(22) Filed: Dec. 28, 2005

(65) Prior Publication Data

US 2006/0103906 A1 May 18, 2006

Related U.S. Application Data

(63) Continuation of application No. PCT/JP2005/014366, filed on Jul. 29, 2005.

(30) Foreign Application Priority Data

Jul. 29, 2004 (JP) ............................. 2004-221598
Jul. 22, 2005 (JP) ............................. 2005-213310

(51) Int. Cl.
*B41J 27/00* (2006.01)
*G02B 26/08* (2006.01)

(52) U.S. Cl. ....................................... 347/257; 359/205
(58) Field of Classification Search ......... 359/205–208, 359/846–847, 849; 347/257, 259

See application file for complete search history.

(56) References Cited

U.S. PATENT DOCUMENTS

| 1,489,934 | A | * | 4/1924 | Eklund | 359/862 |
| 5,543,829 | A | * | 8/1996 | Fisli | 347/241 |
| 6,219,082 | B1 | * | 4/2001 | Rumsey et al. | 347/242 |
| 6,414,805 | B1 | * | 7/2002 | Reichman et al. | 359/889 |
| 6,731,419 | B2 | * | 5/2004 | Koreeda | 359/210 |

FOREIGN PATENT DOCUMENTS

| JP | 8-146325 | 6/1996 |
| JP | 10-186257 | 7/1998 |
| JP | 11-231240 | 8/1999 |
| JP | 2000-131636 | 5/2000 |
| JP | 2000-180778 | 6/2000 |
| JP | 2000-235290 | 8/2000 |
| JP | 2000-258713 | 9/2000 |
| JP | 2001-117040 | 4/2001 |
| JP | 2001-215434 | 8/2001 |
| JP | 2001-228427 | 8/2001 |
| JP | 2002-182145 | 6/2002 |
| JP | 2003-270573 | 9/2003 |

* cited by examiner

*Primary Examiner*—Stephone B. Allen
*Assistant Examiner*—Jennifer L. Doak
(74) *Attorney, Agent, or Firm*—Fitzpatrick, Cella, Harper & Scinto

(57) ABSTRACT

An optical scanning apparatus for correcting the curvature of a scanning line effectively by a small number or parts, having a rotary polygon mirror for scanning a ray of light, and a reflecting mirror formed over an entire area in the scanning direction of the ray of light, and scanning the ray of light on an image bearing member, the reflecting mirror is nipped and held between a support member for supporting the reflecting mirror and a pressure member for pressing the reflecting mirror toward the support member side, and the pressure member is movable in a main scanning direction.

11 Claims, 15 Drawing Sheets

OPTICAL SCANNING APPARATUS HAVING SCANNING LINE CURVATURE CORRECTING MECHANISM WITH SLIDING PRESSURE POINT ALONG A LONGITUDINAL DIRECTION OF THE OPTICAL ELEMENT

This application is a continuation of International Application No. PCT/JP2005/014366, filed on Jul. 29, 2005, which claims the benefit of Japanese Patent Application Nos. 2004-221598 filed on Jul. 29, 2004 and 2005-213310 filed on Jul. 22, 2005.

BACKGROUND OF THE INVENTION

1. Field of the Invention

The invention relates to an optical scanning apparatus like a laser scanner unit carried on an image forming apparatus such as a copying machine or a printer, and particularly to an optical scanning apparatus having a scanning line curvature correcting mechanism capable of adjusting the amount of curvature of a mirror and correcting the curvature of a scanning line.

2. Related Background Art

As a color copying machine or a color printer using an electrophotographic recording technique, there is an apparatus in which a plurality of image forming portions are disposed in a tandem type. This tandem type image forming apparatus has the merit that it has relatively many available recording media and is high in recording speed, and is becoming the leading form of color image forming apparatuses in recent years.

Each of the image forming portions (usually four image forming portions) has a photosensitive member, a charger for charging the photosensitive member, an optical scanning apparatus for scanning the charged photosensitive member by a laser beam according to image information, a developing device for developing an electrostatic latent image formed on the photosensitive member with a toner, and a transfer charger for transferring a toner image formed on the photosensitive member to recording paper (or an intermediate transfer member).

In such a tandem type image forming apparatus, in order to suppress the color misregister of toner images of four colors superposed onto the recording paper (or the intermediate transfer member), it is necessary to correct the shape of a scanning line by the laser beam emerging from each optical scanning apparatus, and suppress the deviation of the shapes of the scanning lines. There are various correction items, and one of them is the correction of the curvature of the scanning line.

As the causes of the scanning line by the laser beam being curved, there are various causes such as the mounting tolerance of an fθ lens or a mirror carried on the optical scanning apparatus with respect to an optical box, and the manufacturing tolerances of these optical elements themselves. For example, on the optical scanning apparatus, there is carried a mirror for reflecting the laser beam deflected by a polygon mirror, but it is very difficult to manufacture the mirror so that there may be no warp in the glass substrate of this mirror, and usually there is some warp. This warp of the mirror is one of the causes of the scanning line being curved.

As a method of the correction of the curvature of the scanning line, there is a method of adjusting a degree of curvature of a laser beam reflecting mirror provided in the optical scanning apparatus. For example, Japanese Patent Application Laid-open No. H8-146325, Japanese Patent Applications Laid-open No. H10-186257, Japanese Patent Application Laid-open No. H11-231240, Japanese Patent Application Laid-open No. 2000-180778, Japanese Patent Application Laid-open No. 2000-235290, Japanese Patent Application Laid-open No. 2000-258713, Japanese Patent-Application Laid-open No. 2001-117040 and Japanese Patent Application Laid-open No. 2003-270573 disclose optical scanning apparatuses provided with mechanisms for adjusting the degree of curvature of a mirror (scanning line curvature correcting mechanisms).

Any of the curvature correcting mechanisms described in these patents adjusts the degree of curvature of the mirror by mirror pressure amount adjusting means provided in the longitudinally central portions or the longitudinally opposite end portions of the mirror to thereby correct the curvature of the scanning line.

For example, the optical scanning apparatus described in Japanese Patent Application Laid-open No. 2001-117040 is provided with pressure amount adjusting screws in the longitudinally opposite end portions of the mirror, and these screws are turned to thereby adjust the degree of curvature of the mirror.

Also, the optical scanning apparatus described in Japanese Patent Application Laid-open No. 2000-180778 is provided with a pressure amount adjusting screw in the longitudinally central portion of the mirror, and this screw is turned to thereby adjust the degree of curvature of the mirror.

SUMMARY OF THE INVENTION

The present invention provides an optical scanning apparatus having a simple scanning line curvature correcting mechanism replacing the above-described conventional art.

The present invention has been made in view of the above-noted situation and an object thereof is to provide an optical scanning apparatus having a scanning line curvature correcting mechanism of simple structure.

Another object of the present invention is to provide an optical scanning apparatus having:

a deflector for deflecting a laser beam, emitted from a light source;

an optical element for directing the laser beam deflected by the deflector to a scanned surface; and a curvature correcting mechanism for correcting the curvature of a scanning line formed on the scanned surface by the laser beam, the curvature correcting mechanism having a support member for supporting the vicinity of the longitudinal end portion of the optical element, and a pressure member cooperating with the support member to nip the optical element therebetween, wherein the distance in the longitudinal direction between a supporting point by the support member and a pressure point by the pressure member is adjustable.

Further objects of the present invention will become apparent from the following detailed description when read with reference to the accompanying drawings.

DESCRIPTION OF THE PREFERRED EMBODIMENTS

First Embodiment

A first embodiment of the present invention will hereinafter be described with reference to the drawings. The whole of an image forming apparatus will first be described, whereafter the detailed construction of an optical scanning apparatus will be described.

(Image Forming Apparatus)

Figure 8:
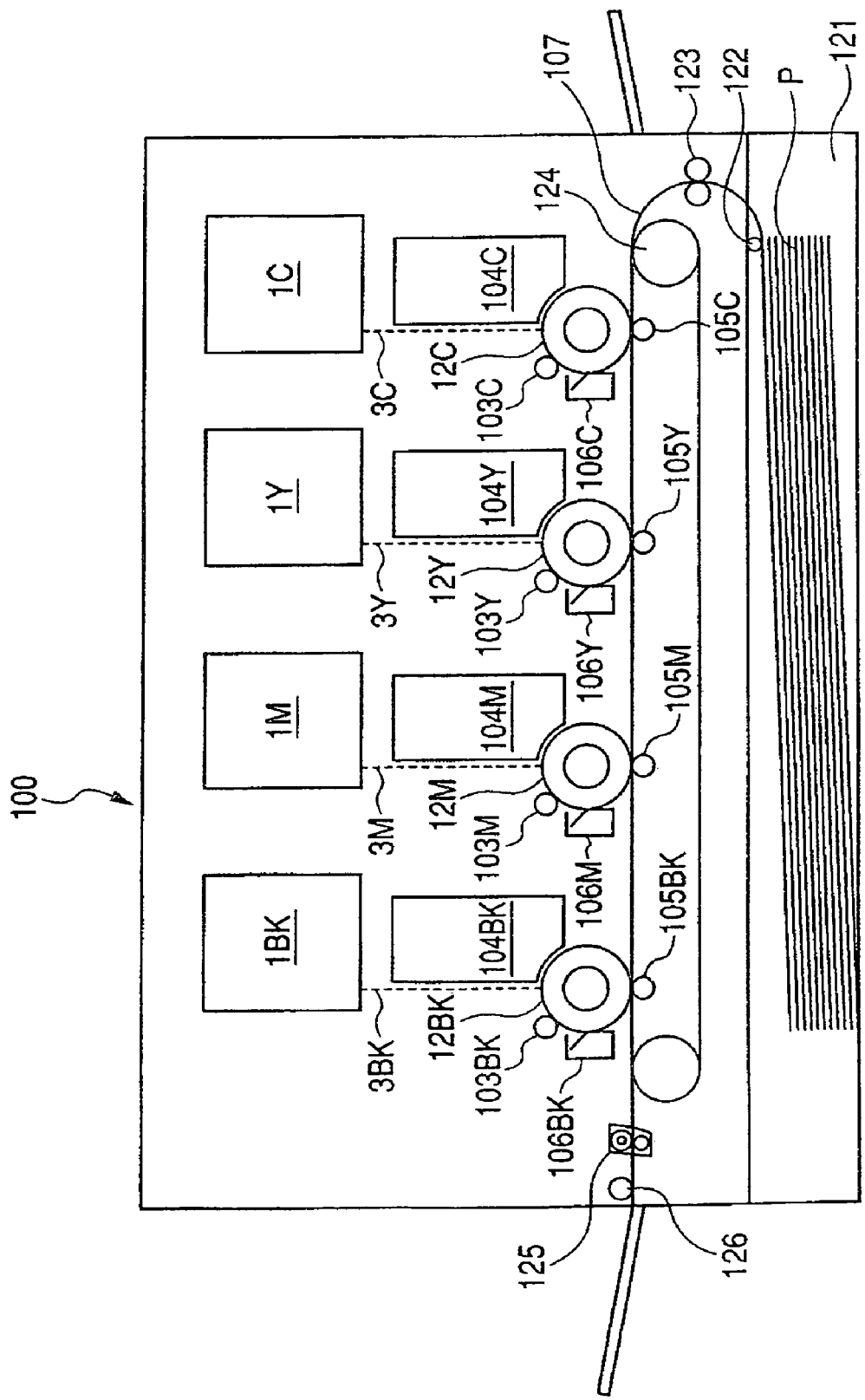
FIG. 8 is a schematic cross-sectional view of an image forming apparatus carrying the optical scanning apparatus of the present invention thereon.

The image forming apparatus will first be described. In the present embodiment, description will be made of a color image forming apparatus having a plurality of image bearing members (photosensitive members). FIG. 8 is a schematic illustration of the image forming apparatus.

The image forming apparatus according to the present embodiment is a full-color printer having four image forming portions disposed in a tandem type. Each image forming portion has a photosensitive member, a charger for charging the photosensitive member, an optical scanning apparatus for scanning the charged photosensitive member by a laser beam according to image information, a developing device for developing an electrostatic latent image formed on the photosensitive member with a toner, and a transfer charger for transferring a toner image formed on the photosensitive member to a recording paper (or an intermediate transfer member). The four photosensitive drums described herein correspond to colors in which they are developed. That is, cyan is C, yellow is Y, magenta is M, and black is Bk. Description will hereinafter be made in detail.

Around the photosensitive drum 12 (12C, 12Y, 12M, 12Bk), there are disposed a primary charger 103 (103C, 103Y, 103M, 103Bk) for uniformly charging the photosensitive drum 12, an optical scanning apparatus 1 (1C, 1Y, 1M, 1Bk) for scanning the charged photosensitive drum by a laser beam according to image information, a developing device 104 (104C, 104Y, 104M, 104Bk) for supplying a toner to an electrostatic latent image to thereby effect development, a transfer roller 105 (105C, 105Y, 1051M, 105Bk) for effecting the transfer of a toner image to a transfer material P such as paper, and a cleaner 106 (106C, 106Y, 106M, 106Bk) for removing toner not transferred but residual on the photosensitive drum.

Also, a conveying belt 107 for conveying the transfer material P to the nip between the photosensitive drum 12 and the transfer roller 105 is disposed while being passed over a drive roller 124, etc.

Also, below the conveying belt 107, there are provided a feeding tray 121 for stacking and holding transfer material P such as paper thereon, a feeding roller 122 for paying away the transfer materials P from the feeding tray 121, and registration rollers 123 for adjusting the posture of the transfer materials P and yet, supplying the transfer materials P to the conveying belt 107 in timed relationship with image formation. Also, downstream of the conveying belt 107 with respect to the conveying direction of the transfer materials P, there are disposed a fixing device 125 for fixing the toner image transferred to the transfer material P, and a discharge roller 126 for discharging the transfer material P out of the apparatus.

By this construction, the image forming apparatus forms an image in the following manner. First, laser beams (rays) 3C, 3Y, 3M and 3Bk are applied from the optical scanning apparatuses 1 to the photosensitive drums 12 uniformly charged by the primary chargers 103. These rays are optically modulated on the basis of the image information and thus, an electrostatic latent image according to each image information is formed on each photosensitive drum 12.

The electrostatic latent images are visualized by cyan, yellow, magenta and black toners being supplied thereto by the developing devices 104.

On the other hand, the transfer materials P stacked on the feeding tray 121 are fed one by one by the feeding roller 122, and are fed out onto the conveying belt 107 by the registration rollers 123 in synchronism with a start timing of the image scanning. During the time when the transfer material P is being accurately conveyed on the conveying belt 107, the cyan image, the yellow image, the magenta image and the black image formed on the surfaces of the photosensitive drums 12 are successively transferred onto the transfer material P, whereby a color image is formed. Thereafter, any residual toners residual on the surfaces of the photosensitive drums 12 are removed by the cleaners 106, and the photosensitive drums are again uniformly charged by the primary chargers 103 to form the next color image.

The drive roller 124 accurately effects the movement of the conveying belt 107, and is connected to a drive motor (not shown) which is small in the irregularity of rotation. The color image formed on the transfer material P is heat fixed by the fixing device 125, whereafter the transfer material P is conveyed and discharged out of the apparatus by the discharge roller 126, etc.

(Optical Scanning Apparatus)

Figure 1:
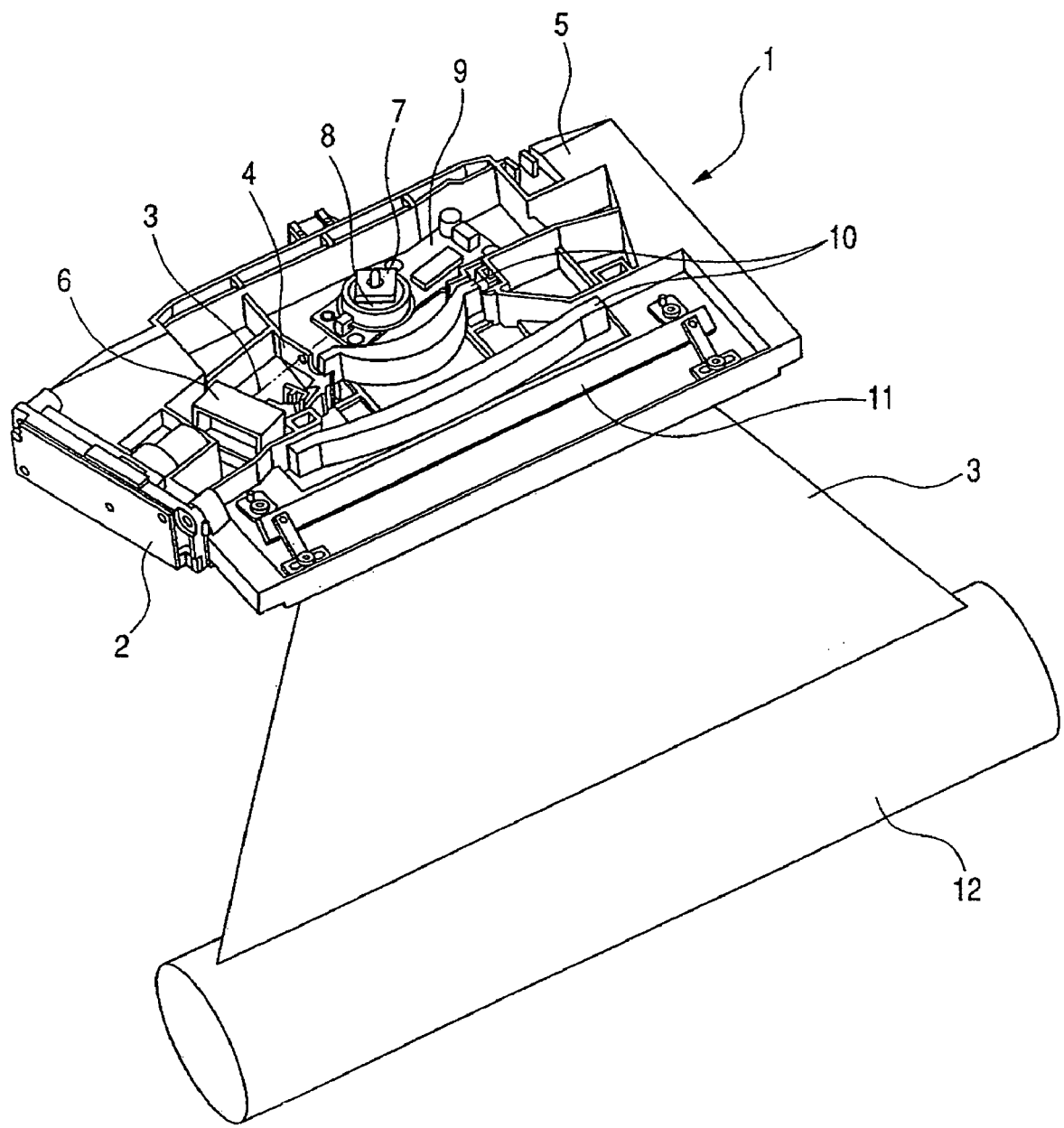
FIG. 1 is a perspective view of an optical scanning apparatus according to Embodiment 1 of the present invention.

The optical scanning apparatus 1 will now be described in detail. FIG. 1 is a perspective view of the optical scanning apparatus. As shown in FIGS. 1 and 8, one optical scanning apparatus 1 is disposed for one photosensitive drum 12 above the photosensitive drum 12.

The optical scanning apparatus 1 contains the following optical parts, etc. in an optical box (housing) 5. The optical box 5 has therein a laser beam source unit 2 for emitting a laser beam, a cylindrical lens 6 for condensing light only in a sub-scanning direction (a direction orthogonal to a main scanning direction in which the laser beam is scanned), an optical stop 4 for limiting the diameter of the laser beam 3 to a predetermined diameter, a rotary polygon mirror (deflector) 7 having a plurality of reflecting surfaces 8 and scanning (deflecting) the laser beam 3, a circuit substrate 9 carrying thereon a motor for rotatively driving the rotary polygon mirror 7, scanning lenses (fθ lenses) 10 and a reflecting mirror (reflecting mirror) 11 for reflecting the laser beam 3 toward the photosensitive drum 12. The reflecting mirror 11 is disposed so that the main scanning direction in which the laser beam 3 is scanned may be longitudinal. In the present embodiment, two scanning lenses 10 are disposed in series and used.

By this construction, the laser beam 3 emitted from the laser beam source unit 2 is condensed only in the sub-scanning direction by the cylindrical lens 6, is limited to a predetermined beam diameter by the optical stop 4, and is condensed on the reflecting surface 8 of the rotary polygon mirror 7. The rotary polygon mirror 7 deflects the laser beam 3 incident on the reflecting surface 8 in the main scanning direction. The deflected laser beam 3 passes through the two scanning lenses 10, and thereafter is reflected by the reflecting mirror 11, and is scanned on and exposes the photosensitive drum (scanned surface) 12 thereto to thereby form an electrostatic latent image on the photosensitive drum 12

(Construction for Supporting the Reflecting Mirror (Optical Element) 11)

Figure 2A:
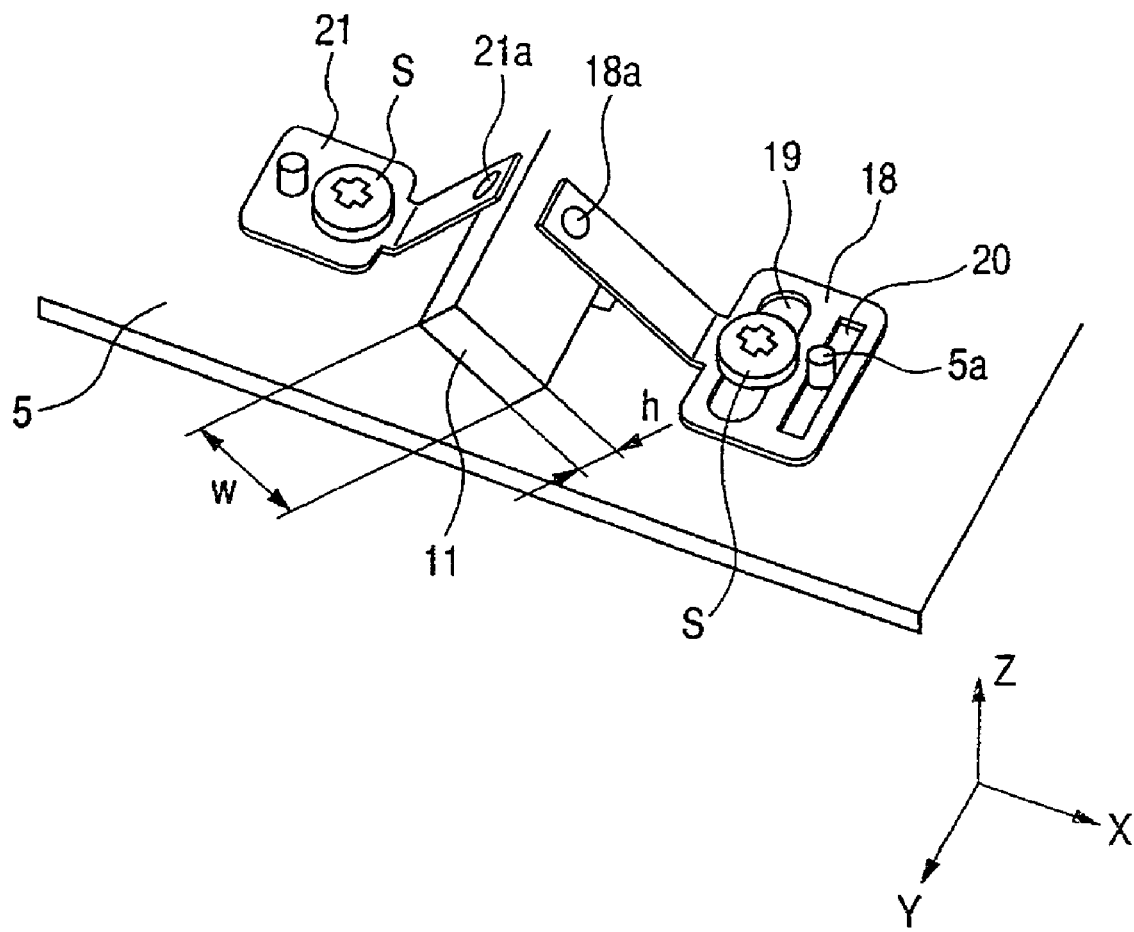
FIGS. 2A and 2B are a perspective view and a cross-sectional view, respectively, of scanning line curvature correcting mechanisms provided near the longitudinally opposite end portions of a reflecting mirror.
Figure 2B:
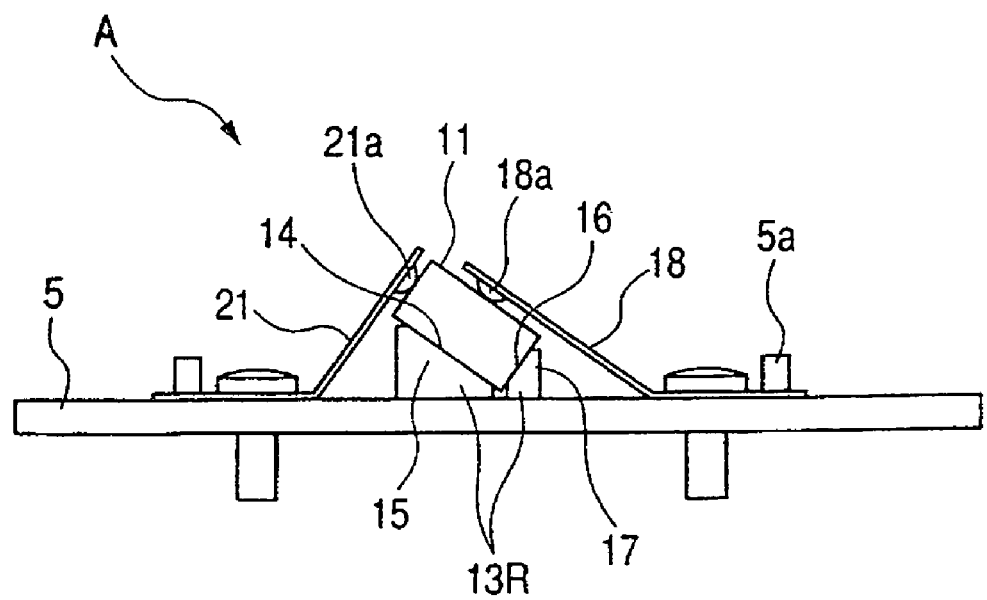

A construction for supporting the reflecting mirror 11 will now be described in detail with reference to FIGS. 2A and 2B. FIGS. 2A and 2B illustrate a state in which the reflecting mirror 11 is mounted on the optical box 5. In FIGS. 2A and 2B, only one end portion of the reflecting mirror 11 in the longitudinal direction (main scanning direction) thereof is shown, but the opposite end portion is also of the same shape. Also, FIG. 2A is a perspective view of the vicinity of one end portion of the reflecting mirror 11, and FIG. 2B is a view taken along the direction indicated by the arrow Y in FIG. 2A.

As shown in FIGS. 2A and 2B, the reflecting mirror 11 has a rectangular cross section, and has a reflecting surface 14 for reflecting the laser beam 3, and a surface 16 adjacent thereto. In FIG. 2A, the width of the reflecting surface 14 is indicated as "w", and the width of the adjacent surface 16 is indicated as "h". Here, the vicinity of the opposite end portions of the reflecting surface 14 of the reflecting mirror 11 in the longitudinal direction of the mirror is placed on a pedestal 15, and the adjacent surface 16 is placed on a pedestal 17, whereby the reflecting mirror 11 has its lower portion positioned. Here, the pedestal 15 and the pedestal 17 are generically named a mirror supporting member (support member) 13, and the reflecting mirror 11 has its lower portion supported at two points in the longitudinal direction thereof by two mirror supporting members 13R and 13L (see FIGS. 3A to 3C).

The pedestal 15 and the pedestal 17 form a portion of the optical box 5 (are molded integrally with the optical box 5).

Also, two leaf-shaped resilient members (leaf springs 18 and 21) are disposed on the optical box 5 at locations opposed to the mirror supporting members 13R and 13L on the upper portion of the reflecting mirror 11. Thereby, the reflecting mirror 11 is pressure supported toward the mirror supporting member 13. That is, the two leaf springs 18 and 21 cooperate with the support members 13R and 13L to nip the mirror 11 therebetween. Specifically, the projection-shaped pressure portion 18a of the leaf spring (pressure member) 18 presses the back side of the reflecting surface 14 of the reflecting mirror 11 to thereby bias the reflecting mirror 11 toward the pedestal 15. Also, the projection-shaped pressure portion 21a of the leaf spring 21 presses the back side of the adjacent surface 16 of the reflecting mirror 11 to thereby bias the reflecting mirror 11 toward the pedestal 17.

The leaf springs 18 and 21 are fixed to and supported on the optical box 5 by screws S. The leaf spring 18 is formed with a guide hole 20 and an elongate hole 19. The guide hole 20 is for slidably moving the leaf spring 18 in the longitudinal direction along the guide protrusion 5a of the optical box 5. Also the elongate hole 19 is for effecting the fixing by the screw S, and is formed with a width smaller than the head of the screw and in parallelism to the guide hole 20. As described above, the leaf spring 18 can be moved in parallelism to the longitudinal direction of the reflecting mirror 11, and the leaf spring 18 can press the back side of the reflecting surface 14 of the reflecting mirror 11.

(Construction for Correcting the Curvature of a Scanning Line)

Figure 3A:
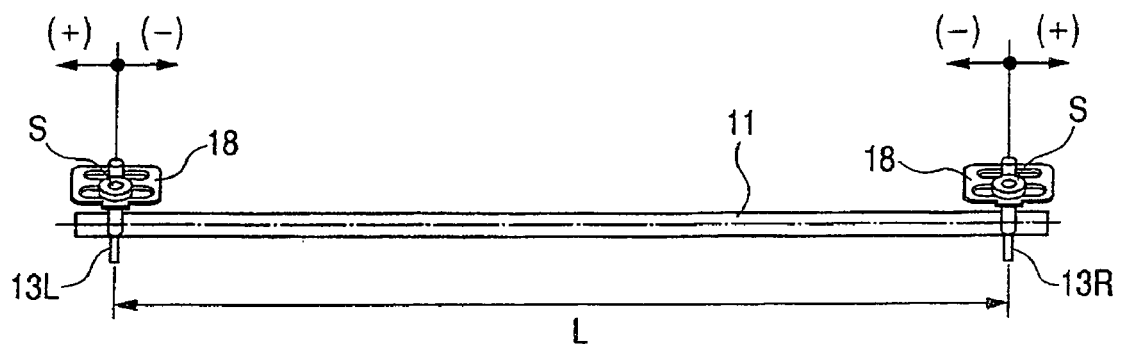
FIGS. 3A, 3B and 3C are typical views showing a state in which a pressure member is moved in a main scanning direction to thereby flex the reflecting mirror.
Figure 3B:
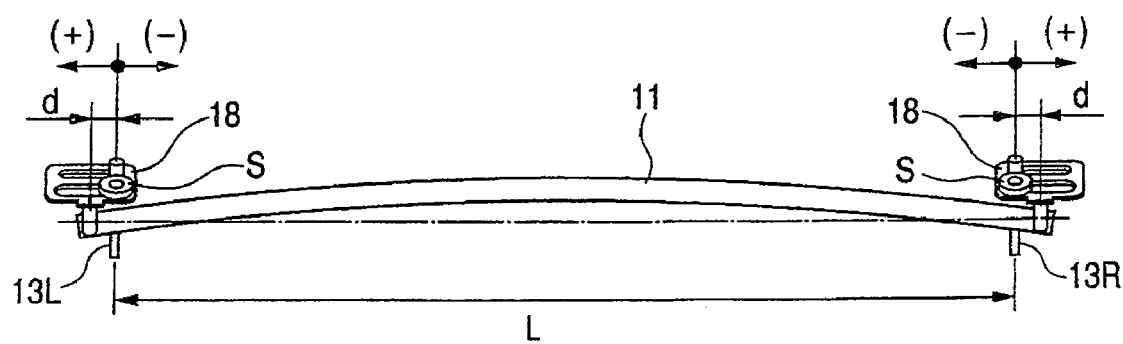
Figure 3C:
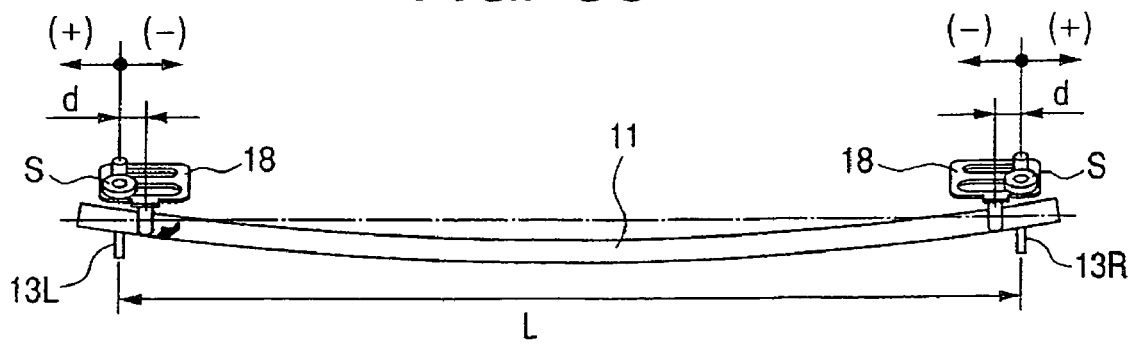
Figure 4:
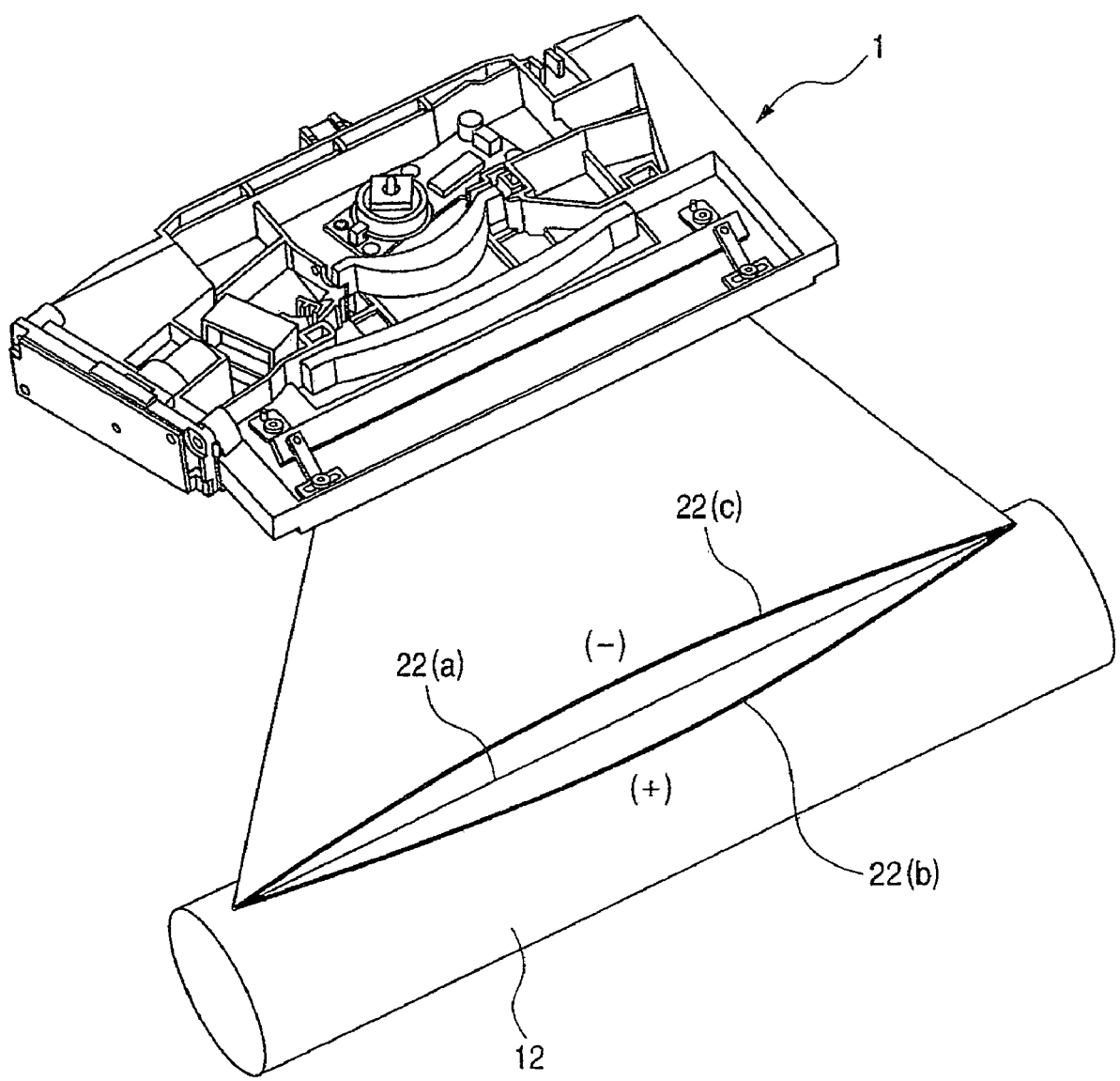
FIG. 4 is a perspective view for illustrating the relation between the movement direction of the pressure member and the curvature direction of a scanning line.

A construction for correcting the curvature of a scanning line (scanning line curvature correcting mechanism) will now be described with reference to FIGS. 3A to 3C and FIG. 4. FIGS. 3A to 3C show the states of the deformation of the reflecting mirror 11 when the pressure position of the leaf spring 18 is moved in the longitudinal direction of the reflecting mirror 11, and are typical views in which FIG. 2B is seen in the direction indicated by the arrow A. Also, FIG. 4 illustrates how a scanning line produced on the photosensitive drum 12 changes as the result of the deformation of the reflecting mirror 11.

When in the process of manufacturing the image forming apparatus according to the present embodiment, the curvature of the scanning line on the photosensitive drum 12 occurs due to such a factor as the positional deviation or inclination of an optical element such as the fθ lens or the reflecting mirror, an assembling worker adjusts the position of the leaf spring 18 and curves the reflecting mirror 11 in a direction to negate the curvature of the scanning line. Thereby, the curvature of the scanning line is corrected. This correcting method will hereinafter be described in detail.

Reference is first had to FIGS. 3A to 3C to describe a construction for curving the reflecting mirror 11 from a position parallel to the optical box 5. When as shown in FIG. 3A, the reflecting mirror 11 is to be held in parallelism to the optical box 5, the leaf spring 18 is fixed at locations opposed to the left and right mirror supporting members 13L and 13R.

That is, in the longitudinal direction of the mirror 11, the positions of the pressure portions 18a (force points or pressure points) of the left and right leaf springs 18 overlap the positions of the left and right mirror supporting members 13L and 13R (supporting points). Thereupon, the pressure forces of the leaf springs 18 do not act in a direction to curve the mirror 11, but the springs 18 and the mirror supporting members 13 hold the reflecting mirror 11 without curving the mirror.

When as shown in FIG. 3B, the reflecting mirror 11 is to be curved into a convex shape relative to the optical box 5, the leaf springs 18 are fixed outside the locations opposed to the left and right mirror supporting members 13L and 13R. That is, in the longitudinal direction of the mirror 11, the positions of the pressure portions 18a (force points) of the left and right leaf springs 18 become outward of the positions of the left and right mirror supporting members 13L and 13R (supporting points). Thereupon, the mirror supporting members 13L and 13R push the inner lower portion of the reflecting mirror 11 in the scanning direction thereof at two locations, and the leaf springs 18 push the outer upper portion of the reflecting mirror 11 in the scanning direction thereof. Thereby, the forces of the leaf springs 18 work so that the reflecting mirror 11 may be bent into a convex shape relative to the optical box 5, and the reflecting mirror 11 is curved into a convex shape relative to the optical box 5. When the leaf springs 18 are to be slidden, the screws S need be once loosened, but the positions of these screws S are always constant in the longitudinal direction of the mirror 11. Also, the distance "d" between the supporting point and the force point (pressure point) can be adjusted to thereby adjust the degree of curvature of the mirror 11.

When as shown in FIG. 3C, the reflecting mirror 11 is to be curved into a concave shape relative to the optical box 5, the leaf springs 18 are fixed inside the locations opposed to the left and right mirror supporting members 13L and 13R. That is, in the longitudinal direction of the mirror 11, the positions of the pressure portions 18a (force points) of the left and right leaf springs 18 become inside the positions of the left and right mirror supporting members 13L and 13R (supporting points). Thereupon, the mirror supporting members 13L and 13R push the outer lower portion of the reflecting mirror 11 in the scanning direction thereof at two locations, and the leaf springs 18 push the inner upper portion of the reflecting mirror 11 in the scanning direction thereof. Thereby, the forces of the leaf springs 18 work on the mirror 11 so that the reflecting mirror 11 may be bent in a concave shape relative to the optical box 5, and the reflecting mirror 11 is bent into a concave shape relative to the optical box 5. Again in this case, the distance "d" between the supporting point and the force point (pressure point) can be adjusted to thereby adjust the degree of curvature of the mirror 11.

When the reflecting mirror 11 is curved, a scanning line reflected by the reflecting mirror 11 and formed on the photosensitive drum 12 is curved. FIG. 4 shows a direction in which the scanning line is curved on the photosensitive drum 12. The scanning lines 22(a), 22(b) and 22(c) or the photosensitive drum 12 shown in FIG. 4 indicate the scanning lines when the reflecting mirror 11 has been curved in the directions of FIGS. 3A, 3B and 3C. Thus, the scanning lines 22 formed by the laser beam 3 reflected by the reflecting mirror 11, in accordance with the curvature of the reflecting mirror 11 are also curved.

Now, in the case of a tandem type image forming apparatus, a plurality of optical scanning apparatuses corresponding to a plurality of image forming portions are required, and at a stage before scanning line curvature correction is carried out, it is also conceivable that for example, a scanning line by a laser beam emitted from a first optical scanning apparatus has assumed a concave shape, and a scanning line by a laser beam emitted from a second optical scanning apparatus has assumed a convex shape. That is, it is also conceivable that the curvature direction of the scanning line by the laser beam emitted from the first optical scanning apparatus and the curvature direction of the scanning line by the laser beam emitted from the second optical scanning apparatus differ from each other.

When a plurality of scanning lines differing in the curvature direction from each other as described above are adjusted into a single scanning line shape by adjusting the curved state of the optical element, the curvature adjusting direction of the optical element carried on the first optical scanning apparatus and the curvature adjusting direction of the optical element carried on the second optical scanning apparatus differ from each other. Accordingly, as means for adjusting the curvature of a mirror, a construction which is great in the degree of freedom of adjustment is preferable so as to be capable of coping with both of a case where a scanning line of a concave shape is corrected and a case where a scanning line of a convex shape is corrected.

As previously described, the optical scanning apparatus described in Japanese Patent Application Laid-open No. 2001-117040 is provided with pressure amount adjusting screws on the longitudinally opposite end portions of the mirror, and these screws are turned to thereby adjust the degree of curvature of the mirror.

However, the curvature direction of the mirror adjustable irrespective of the amount of turn of the screws is one direction (one of a direction in which the mirror assumes a concave surface shape and a direction in which the mirror assumes a convex surface shape) and therefore, the degree of freedom of the curvature adjustment of the scanning line is small.

Also, the optical scanning apparatus described in Japanese Patent Application Laid-open No. 2000-180778 is provided with a pressure amount adjusting screw on the longitudinally central portion of the mirror, and this screw is turned to thereby adjust the degree of curvature of the mirror.

Again in this case, however, the curvature direction of the mirror adjustable irrespective of the amount of turn of the screw is one direction and therefore, the degree of freedom of the curvature adjustment of the scanning line is small.

It is also conceivable to provide pressure amount adjusting screws on both of the longitudinally central portion and opposite end portions of the mirror to thereby make the mirror adjustable in two directions, i.e., the direction in which the mirror assumes a concave surface shape and the direction in which the mirror assumes a convex surface shape, but in this case, the number of pressure adjusting means installed increases and therefore, a high cost is required.

In contrast, in the case of the optical scanning apparatus according to the present embodiment, not only the distance "d" between the supporting point by the support member 15 and the force point (pressure point) by the pressure member 18 can be adjusted to thereby adjust the degree of curvature of the scanning line, but also the position of the pressure point by the pressure member 18 is movable beyond the position of the supporting point by the support member 15 with respect to the longitudinal direction of the mirror. By this construction, the present embodiment can cope with both of a case where the scanning line of a concave shape is corrected and a case where the scanning line of a convex shape is corrected, and there is the merit that the degree of freedom of curvature correction becomes very great owing to a simple construction.

A method of correcting the curvature of the scanning line 22 on the photosensitive drum 12 by the use of the above-described scanning line curvature correcting mechanism will hereinafter be shown and described by way of example. When due to the positional deviation, inclination or the like of an optical element such as an fθ lens, the curvature of the scanning line 22 occurs on the photosensitive drum 12, if the reflecting mirror 11 is curved in a direction to offset the curvature of the scanning line 22, the curvature of the scanning line 22 can be corrected.

For example, when the scanning line 22 on the photosensitive drum 12 is curved as indicated by 22(c) in FIG. 4 in a state in which the positions of the pressure portions 18a (force points) of the left and right leaf springs 18 overlap the positions of the left and right mirror supporting members 13L and 13R (supporting points), the outer sides of the left and right mirror supporting members 13 can be pressed and fixed by the leaf springs 18, as shown in FIG. 3B. Thereupon, by distortion occurring to the reflecting mirror, the scanning line is curved in a direction 22(b) in FIG. 4. Thereby, the curvatures of the scanning lines negate with each other, whereby the curvature of the scanning line 22 can be corrected. When conversely, the direction in which the scanning line 22 is curved is 22(b) in FIG. 4 in a state in which the positions of the pressure portions 18a (force points) of the left and right leaf springs 18 overlap the positions of the left and right mirror supporting members 13L and 13R (supporting points), the inner sides of the left and right mirror, supporting members 13 can be pressed and fixed by the leaf springs 18, as shown in FIG. 3C.

Also, the amount of adjustment of the curvature of the scanning line depends on the distance "d" between the supporting point of the mirror supporting member 13 and the pressure point (force point) of the leaf spring 18. Therefore, the positions of the pressure points of the leaf springs 18 of each optical scanning apparatus 1 (1C, 1Y, 1M, 1K) is adjusted so that color misregister by the four image forming portions may not occur, whereby the deviation of the scanning lines among the four image forming portions can be corrected.

As described above, the scanning line curvature correcting mechanism in the present embodiment can adjust the distance "d" in the longitudinal direction of the mirror between the supporting point by the supporting member and the pressure point (force point) by the pressure member. Also, the position of the support member is fixed, and the position of the pressure point is adjustable in the longitudinal direction of the mirror. Further, the pressure member is moved in the longitudinal direction of the mirror, whereby the position of the pressure point is adjustable. Further, the position of the pressure point by the pressure member is movable beyond the position of the supporting point by the support member with respect to the longitudinal direction of the mirror.

Figure 5:
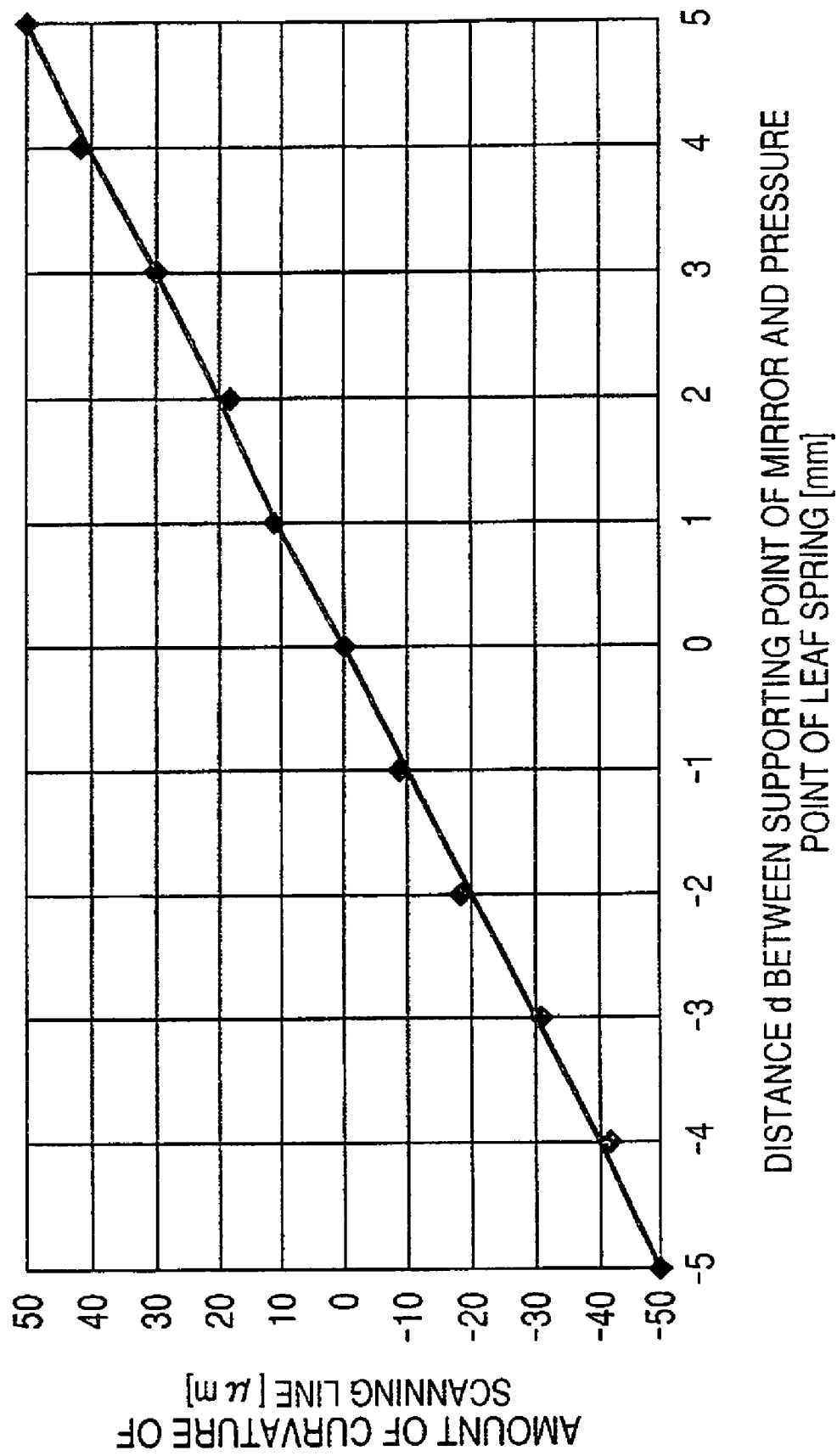
FIG. 5 shows the relation between the distance "d" between the supporting point of a mirror supporting member and the pressure point of a leaf spring and the amount of curvature of the scanning line.
Figure 10:
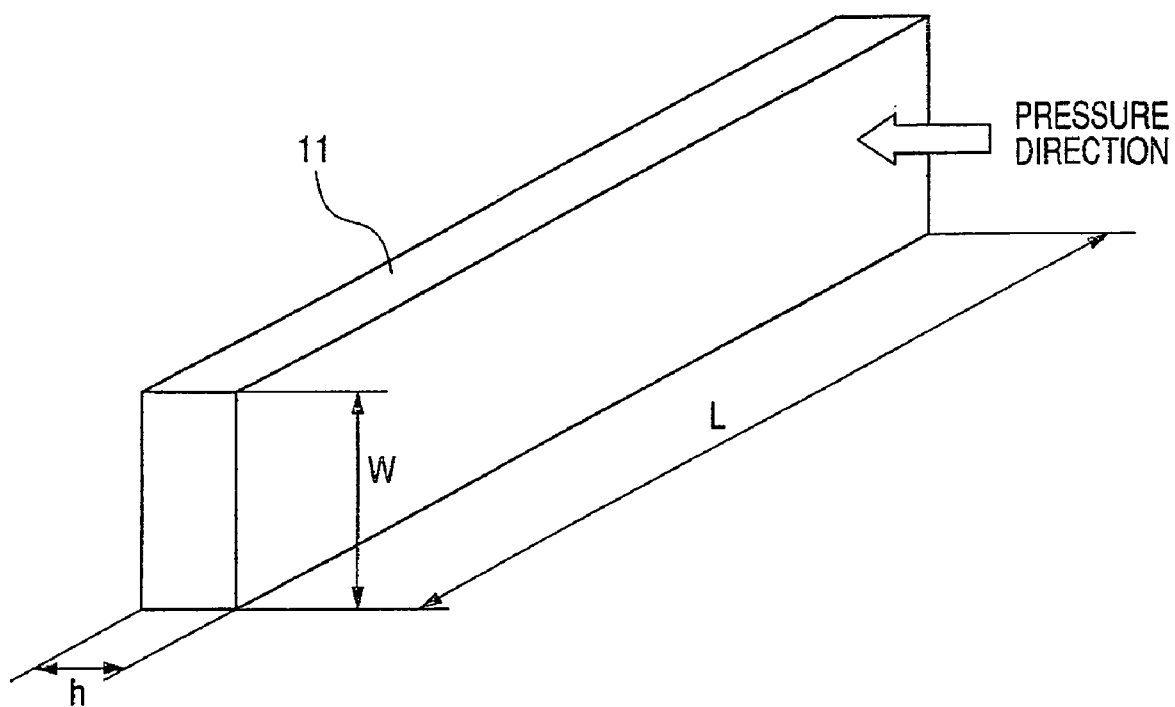
FIG. 10 is a perspective view showing the size and pressure direction of a reflecting mirror used when the relation between the distance "d" and the amount of curvature in FIG. 5 is examined.

The relation between the distance "d" (mm) between the supporting point of the mirror supporting member 13 and the pressure point of the leaf spring 18 and the amount of curvature (μm) of the scanning line 22 will now be described with reference to FIG. 5. FIG. 5 shows the result of an experiment showing the amount of curvature of the scanning line when the pressure positions of the leaf springs 18 have been changed under the condition that the distance L=170 mm between the mirror supporting members 13L and 13R, the thickness h=5 mm of the reflecting mirror 11, and the width w=10 mm of the reflecting mirror 11. FIG. 10 shows the relation between the size of the mirror 11 and the pressure direction by the leaf springs 18.

The signs of the axis of abscissas of FIG. 5 coincide with the signs (+) and (−) in FIGS. 3A to 3C.

Also, the signs of the axis of ordinates coincide with the signs (+) and (−) in FIG. 4. It can be seen from FIG. 5 that when the pressure load of the leaf springs 18 is constant, the distance "d" and the amount of curvature of the scanning line 22 are in a proportional relation.

According to the present embodiment, there is provided a construction in which the leaf springs 18 originally disposed only for holding the reflecting mirror 11 are moved in the longitudinal direction of the reflecting mirror 11. Therefore, a discrete mechanism for correcting the curvature of the scanning line is unnecessary. Accordingly, the number of parts can be curtailed and therefore, the cost of parts and the assembling cost of the parts can be curtailed. Also, the leaf springs 18 are designed to be capable of pressing the inside and outside of the positions opposed to the mirror supporting members 13, that is, the position of the pressure point by the pressure member is movable beyond the position of the supporting point by the support member with respect to the longitudinal direction of the mirror and therefore, the degree of freedom of the correction of the curvature of the scanning line is great, and the present embodiment can cope with both of a case where the shape of the scanning line before the correction of curvature is a concave shape and a case where it is a convex shape.

Also, the portions into which the screws S of the leaf springs 18 are inserted are provided by the elongate holes 19. By this construction, when the correction of curvature is to be effected, the leaf springs can be moved by the screws S being simply loosened without being removed and therefore, the adjusting work can be done easily.

Particularly, in a tandem type color image forming apparatus using a plurality of optical scanning apparatuses, toner images formed on a plurality of photosensitive drums are superposed one upon another and therefore, it is preferable that the deviation among electrostatic latent images formed on the photosensitive drums be small. According to the present embodiment, the curvature of the scanning line of each color can be suppressed small and the directions of the convexness and concaveness of the curvature can be uniformized and therefore, the deviation among the electrostatic latent images becomes small. Therefore, an image which is small in the curvature of the scanning line and is minimum in color misregister can be provided inexpensively.

Second Embodiment

Figure 6A:
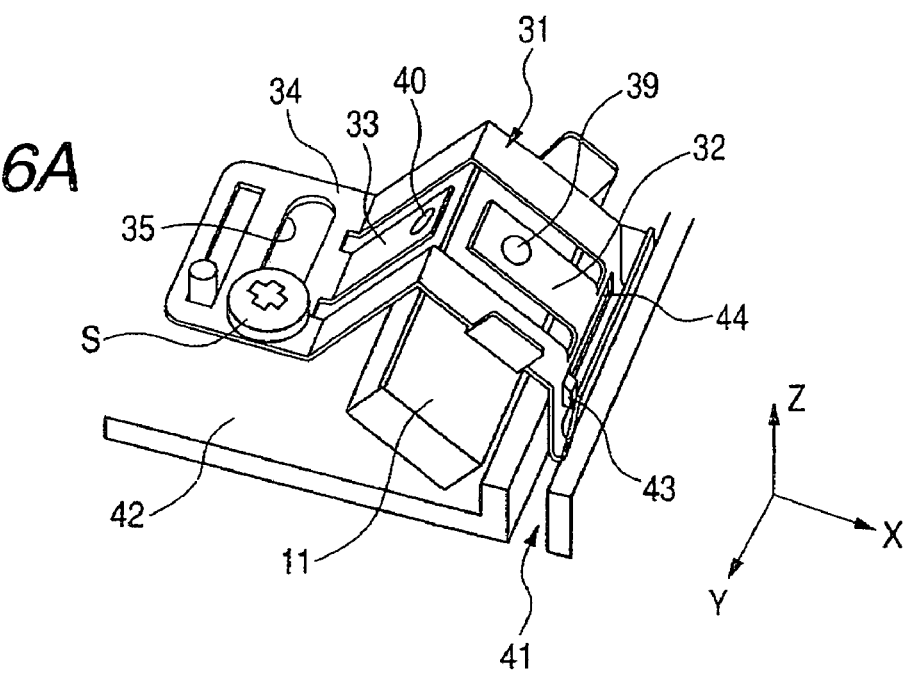
FIGS. 6A, 6B and 6C are a perspective view, a cross-sectional view and a top plan view, respectively, of a scanning line curvature correcting mechanism provided in an optical scanning apparatus according to Embodiment 2 of the present invention.
Figure 6B:
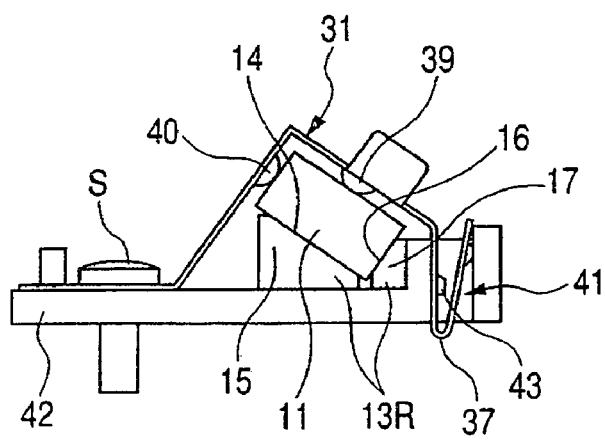
Figure 6C:
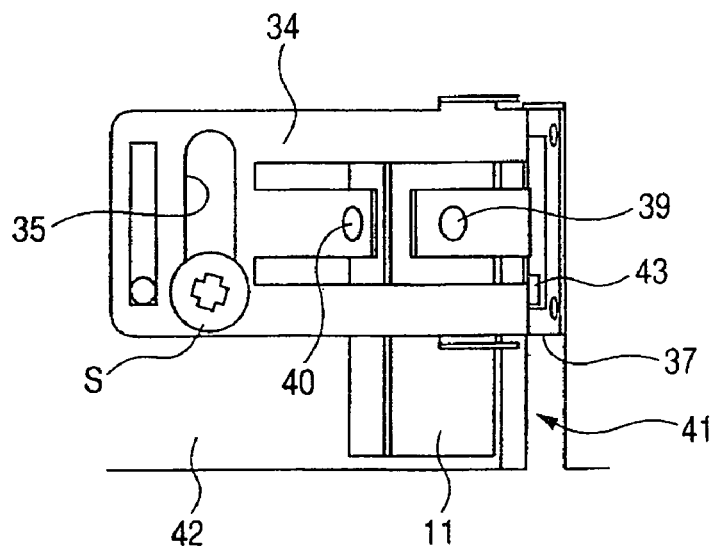

A second embodiment of the present invention will now be described with reference to FIGS. 6A to 6C. Leaf springs (pressure members) 31 in this embodiment, like the leaf springs in the aforedescribed embodiments, are for fixing the reflecting mirror 11 at positions opposed to the left and right mirror supporting members 13. Also, the leaf springs 31 are movable in the longitudinal direction (main scanning direction) of the reflecting mirror 11, and the leaf springs 31 are moved to thereby curve the reflecting mirror 11 and correct the curvature of the scanning line 22. The leaf springs 31 for supporting the reflecting mirror 11 will be described in greater detail. Members similar to those described previously are given the same reference characters and need not be described.

(Construction for Supporting the Reflecting Mirror 11)

A construction for supporting the reflecting mirror 11 will hereinafter be described in detail with reference to FIGS. 6A to 6C. FIGS. 6A to 6C illustrate a state in which the reflecting mirror 11 is mounted on an optical box (housing) 42. While in FIGS. 6A to 6C, only one end portion of the reflecting mirror 11 in the longitudinal direction (main scanning direction) thereof is shown, the opposite end portion thereof is of the same shape. Also, FIG. 6A is a perspective view of the vicinity of one end portion of the reflecting mirror 11, FIG. 6B is a view taken along the direction indicated by the arrow Y in FIG. 6A, and FIG. 6C is a view taken along the direction indicated by the arrow Z in FIG. 6A.

The leaf spring (pressure member) 31 in the present embodiment has been worked by bending a metal sheet in accordance with the shape of the reflecting mirror 11 so as to cover the upper portion of the reflecting mirror 11. The leaf spring 31 has leaf shaped resilient portions 32 and 33 for pressing the reflecting mirror 11, a frame portion 34 surrounding these resilient portions, etc.

The resilient portion 32 is formed with a projection-shaped pressure portion (pressure point (force point)) 39 for pressing that surface of the reflecting mirror 11 which is opposed to a reflecting surface 14 toward a pedestal (support member) 15, and the resilient portion 33 is formed with a projection-shaped pressure portion 40 for pressing that surface of the reflecting mirror 11 which is opposed to an adjacent surface 16 toward a pedestal 17. That is, the leaf spring 31 presses the plurality of different surfaces of the mirror 11. The pressure portion 39 and the pressure portion 40 are arranged on one and the same straight line in a direction orthogonal to the main scanning direction of a laser beam 3. The reflecting mirror 11 is pressed against and fixed to the optical box 42 by these pressure portions 39 and 40.

The leaf spring 31 is fixed to the optical box 42 by a screw S being inserted into and fastened in an elongate hole 35 formed near the resilient portion 33 (in the present embodiment, just beneath the root of the resilient portion 33). By the elongate hole 35 being formed, the leaf spring 31 is slidable in the longitudinal direction of the reflecting mirror Also, the leaf spring 31 has a turned-back portion 37 on a side opposite to the screw S with the reflecting mirror 11 as the boundary. The turned-back portion 37 presses a side of a groove 41 formed in the optical box 42 to thereby support the root side of the resilient portion 32 of the leaf spring 31. Also, an elongate hole 44 in which a pawl 43 formed on the optical box 42 side is restrained is formed in that portion of the turned-back portion 37 which is near the resilient portion 32 (in the present embodiment, just beneath the root of the resilient portion 32). Thereby, the leaf spring 31 can be restrained against movement in a vertical direction, and if the screw S is loosened, it is possible to slide and move the leaf spring 31 in the longitudinal direction of the reflecting mirror 11. That is, the leaf spring 31 is fixed at two different points (the position of the screw S and the position of the pawl 43) in a direction intersecting with the longitudinal direction of the mirror so as to cooperate with the support member 13 to encompass a longitudinal portion of the reflecting mirror 11.

By the above-described construction, the leaf spring 31 can be moved in the longitudinal direction of the reflecting mirror 11. Also, the leaf spring 31 in the present embodiment, as in Embodiment 1, is designed to be capable of pressing the inside and outside of the position opposed to the mirror supporting member 13, that is, the position of the pressure point 39 by the pressure member 31 is movable beyond the position of the supporting point by the support member 13 and therefore, the degree or freedom of the correction of the curvature of the scanning line is great, and the leaf spring 31 can cope with both of a case where the shape of the scanning line before the correction of curvature is a concave shape and a case where it is a convex shape. Also, the leaf spring 31 acting to press and fix the reflecting mirror 11 is movable in the longitudinal direction of the mirror and therefore, a discrete mechanism for correcting the curvature of the scanning line is unnecessary. Further, in the present embodiment, the leaf spring 31 is provided with two resilient portions 32 and 33 and therefore, the number of parts can be further curtailed as compared with the first embodiment.

Also, the leaf spring 31 is fixed to the optical box 42 by the elongate hole 44 being restrained on the pawl 43. Therefore, even in a state in which the screw S is loosened, the pressing by the pressure portion 39 is not liberated. Accordingly, a change in the curvature of the scanning line can be observed while the screw S is loosened and the leaf spring 34 is moved. That is, the position of the pressure point 39 is adjustable in a state in which the leaf spring (pressure member) 31 has pressed the mirror 11. Also, even if after the adjustment, the screw S is fastened to thereby fix the leaf spring 31, the adjustment value of the curvature of the scanning line is hardly fluctuated. Consequently, both of the fixing of the reflecting mirror 11 by the leaf spring 31 and the adjustment of the correction of the scanning line can be effected easily and accurately.

Third Embodiment

Figure 7A:
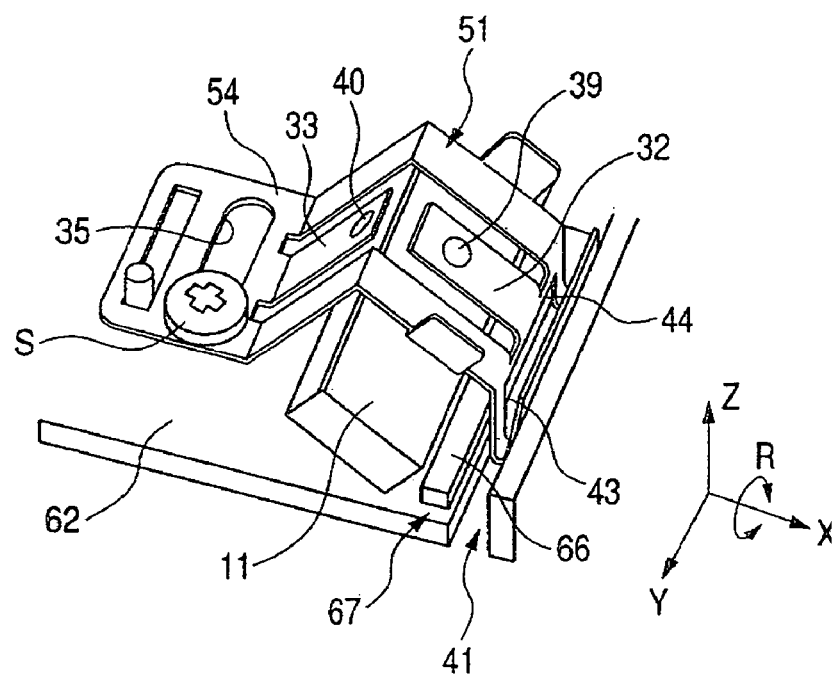
FIGS. 7A, 7B and 7C are a perspective view, a cross-sectional view and a top plan view, respectively, of a scanning line curvature correcting mechanism provided in an optical scanning apparatus according to Embodiment 3 of the present invention
Figure 7B:
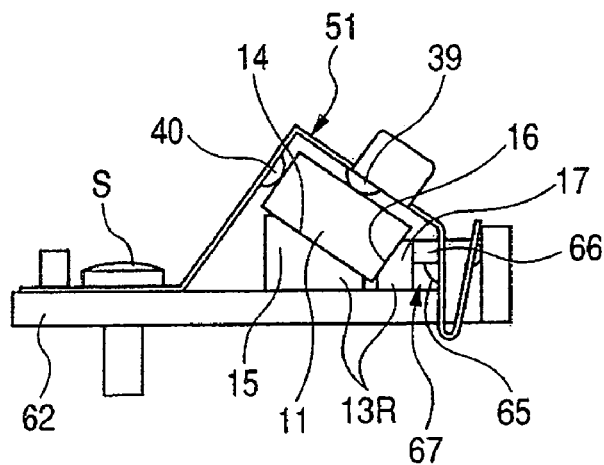
Figure 7C:
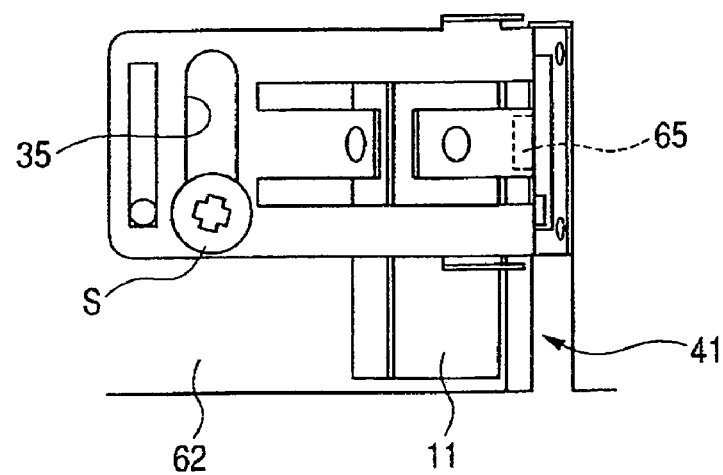

A third embodiment of the present invention will now be described with reference to FIGS. 7A to 7C. Leaf springs (pressure members) 51 in the present embodiment, as in the aforedescribed embodiments, are for fixing the reflecting mirror 11 at positions opposed to the left and right mirror supporting members 13. Also, the leaf springs 51 are movable in the longitudinal direction (main scanning direction) of the reflecting mirror 11, and the leaf springs 51 are moved to thereby curve the reflecting mirror 11, and correct the curvature of the scanning line 22. The leaf springs 51 for supporting the reflecting mirror 11 will hereinafter be described in greater detail. Members similar to those previously described are given the same reference characters and need not be described.

(Construction for Supporting the Reflecting Mirror 11)

A construction for supporting the reflecting mirror 11 will hereinafter be described in detail with reference to FIGS. 7A to 7C. FIGS. 7A to 7C illustrate a state in which the reflecting mirror 11 is mounted on an optical box (housing) 62. While in FIGS. 7A to 7C, only one end portion of the reflecting mirror 11 in the longitudinal direction (main scanning direction) thereof is shown, the opposite end portion is also of the same shape. Also, FIG. 7A is a perspective view of the vicinity of one end portion of the reflecting mirror 11, FIG. 7B is a view taken along the direction indicated by the arrow Y in FIG. 7A, and FIG. 7C is a view taken along the direction indicated by the arrow Z in FIG. 7A.

The leaf spring (pressure member) 51 in the present embodiment has been worked by bending a metal sheet in accordance with the shape of the reflecting mirror 11 so as to cover the upper portion of the reflecting mirror 11. The leaf spring 51 has leaf-shaped resilient portions 32 and 33 for pressing the reflecting mirror 11, a frame portion 54 surrounding these resilient portions, etc. The leaf spring 51 in the present embodiment, as in Embodiment 1, is also designed to be capable of pressing the inside and outside of the position opposed to the mirror supporting member 13, that is, the position of the pressure point 39 by the pressure member 51 is movable beyond the position of the supporting point by the support member 13 with respect to the longitudinal direction or the mirror and therefore, the degree of freedom of the correction of the curvature of the scanning line is great, and the present embodiment can cope with both of a case where the shape of the scanning line before the correction of the curvature is a concave shape and a case where it is a convex shape.

The leaf spring 51 in the present embodiment is provided with a hook (restraining portion) 65 on the lower portion of the resilient portion 32. The hook 65 is formed by cutting away a portion of the frame portion 54, and bending it toward the reflecting mirror 11. Also, the optical box 62 is formed with a groove 41 for nipping and fixing a turned back portion 37. Further, the optical box 62 has a restraining portion for the hook 65 to restrain, at a location opposed to the hook 65 on a side of the groove 41. Again in the present embodiment, as in Embodiment 2, the leaf spring 51 is fixed at two different points (the position of the screw S and the position of the hook 65) in a direction intersecting with the longitudinal direction of the mirror so as to cooperate with the support member 13 to wrap a longitudinal portion of the mirror 11.

Therefore, in the apparatus housing, a restraining groove 67 into which the hook 65 comes is formed between the optical box 62 and the restraining member 66. The restraining groove 67 is formed longer in the main scanning direction than the hook 65, and the length thereof is at least a length by which the leaf spring 51 is movable. Therefore, even when the leaf spring 51 is moved in the longitudinal direction of the reflecting mirror 11, the hook 65 reliably comes into the restraining groove 67, and is restrained by the restraining member 66. The pressure portion 39, the pressure portion 40 and the hook 65 are arranged on one and the same straight line in a direction orthogonal to the main scanning direction of the laser beam 3.

As described above, the pressure portion 39 side of the leaf spring 51 is fixed to the optical box 62 by being pressed against a side of a groove 41 in the turned-back portion 37 and by the hook 65 being restrained on the restraining member 66. Also, the pressure portion 40 side of the leaf spring 51 is fixed to the optical box 62 by the screw S being inserted into and fastened in the elongate hole 35. By the above-described construction, the leaf spring 51 can be moved in the longitudinal direction of the reflecting mirror 11 along the elongate holes 35 and 44.

In addition, in the present embodiment, the hook 65 for restraining the leaf spring 51 on the optical box 62 is formed on the leaf spring 51, and the hook 65 is disposed on the same straight line as the pressure portions 39 and 40. Also, the distal end of the hook 65 always abuts against the restraining member 66. Therefore, when the leaf spring 51 is to be moved in the direction indicated by the arrow Y, it is difficult for rotation about the X-axis (in the direction indicated by the arrow R in FIG. 7A) to occur. Accordingly, when the curvature of the scanning line 22 is to be corrected, the fluctuation of the load of the resilient portions 32 and 33 can be suppressed. As the result, it becomes possible to provide an optical scanning apparatus in which the correction of the curvature of the scanning line 22 is easy to effect.

While in the aforedescribed Embodiments 1 to 3, the distance "d" from the mirror supporting member 13 to the pressure position by the leaf spring during the correction of the curvature of the scanning line 22 has been described as the same distance at the left and right, this is not restrictive. That is, the distance "d" may be a length different between the left and right.

Also, the length L=170 mm of the reflecting mirror 11 shown in the result of the experiment in the embodiments is illustrative, and can be set to a suitable length in accordance with the size of the apparatus.

Also, the shape of the leaf sprint is not restricted to the shapes in the aforedescribed embodiments, but may be any shape. Also, other fixing means than the aforedescribed leaf springs may be used for the fixing of the reflecting mirror 11, and it will suffice if the fixing means is slidable in the longitudinal direction of the reflecting mirror 11. Also, sheet glass can be used as the material of the mirror, but this is not restrictive. Also, the reflecting surface 14 is not restricted to a flat surface, but may be a curved mirror.

Figure 9:
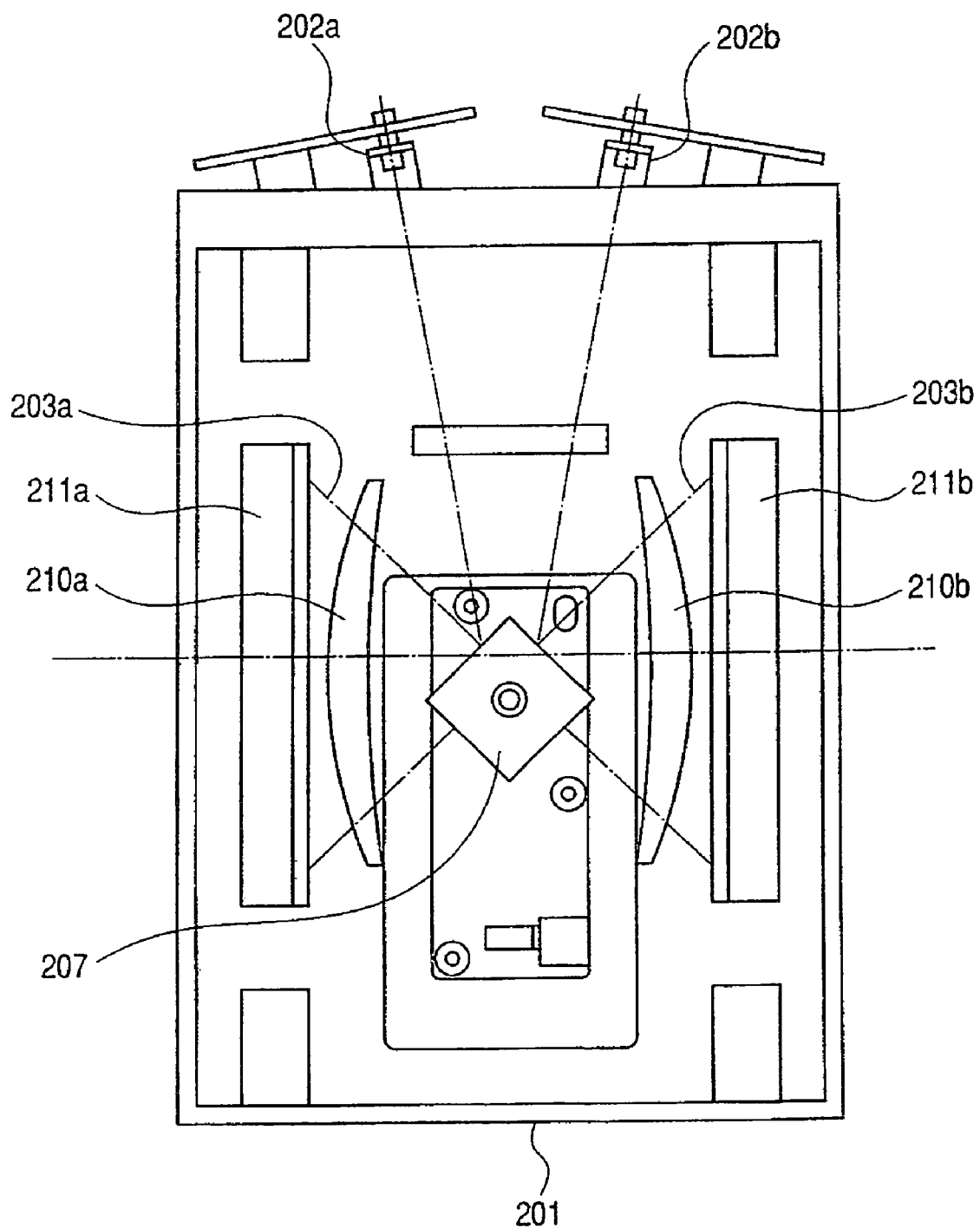
FIG. 9 is an illustration of another optical scanning apparatus capable of carrying thereon a scanning line curvature correcting mechanism according to an embodiment of the present invention.

Also, while in the aforedescribed Embodiments 1 to 3, the scanning line 22 is directed from an optical scanning apparatus 1 to a photosensitive drum, 12, this is not restrictive. For example, there may be adopted a construction in which as shown in FIG. 9, a plurality of (shown as two in FIG. 9, but four will also do) light sources 202a and 202b are carried on an optical scanning apparatus 201, and a plurality of laser beams 203a and 203b travelling toward a plurality of photosensitive drums are emitted from an optical scanning apparatus 201. If so constructed, two optical scanning apparatuses will be enough to construct the image forming apparatus although in the aforedescribed Embodiments 1 to 3, four optical scanning apparatuses are required, and this leads to the curtailment of the number of parts. Also, if in accordance with the curvature of a certain scanning line, the curvature of another scanning line is corrected, the relative difference in the curvature of the scanning line can be eliminated. Thereby, at least one scanning line can be made unnecessary to adjust.

Describing FIG. 9, the emitted laser beams 203a and 203b are directed in two directions by the utilization of the different surfaces of a rotary polygon mirror 207, and pass through a plurality of scanning lenses 210a and 210b, and thereafter are reflected by a plurality of reflecting mirrors 211a and 211b and are directed to a plurality of different photosensitive drums 12.

While in the aforedescribed Embodiments 1 to 3, the leaf springs for pressing the mirror are slidden in the longitudinal direction (main scanning direction) of the mirror to thereby correct the curvature of the scanning line, embodiments shown below are such that a moving piece mounted on a leaf spring is slidden in the longitudinal direction of the mirror while the position of the leaf spring remains fixed, thereby correcting the curvature of the scanning line.

Embodiment 4

Figure 11:
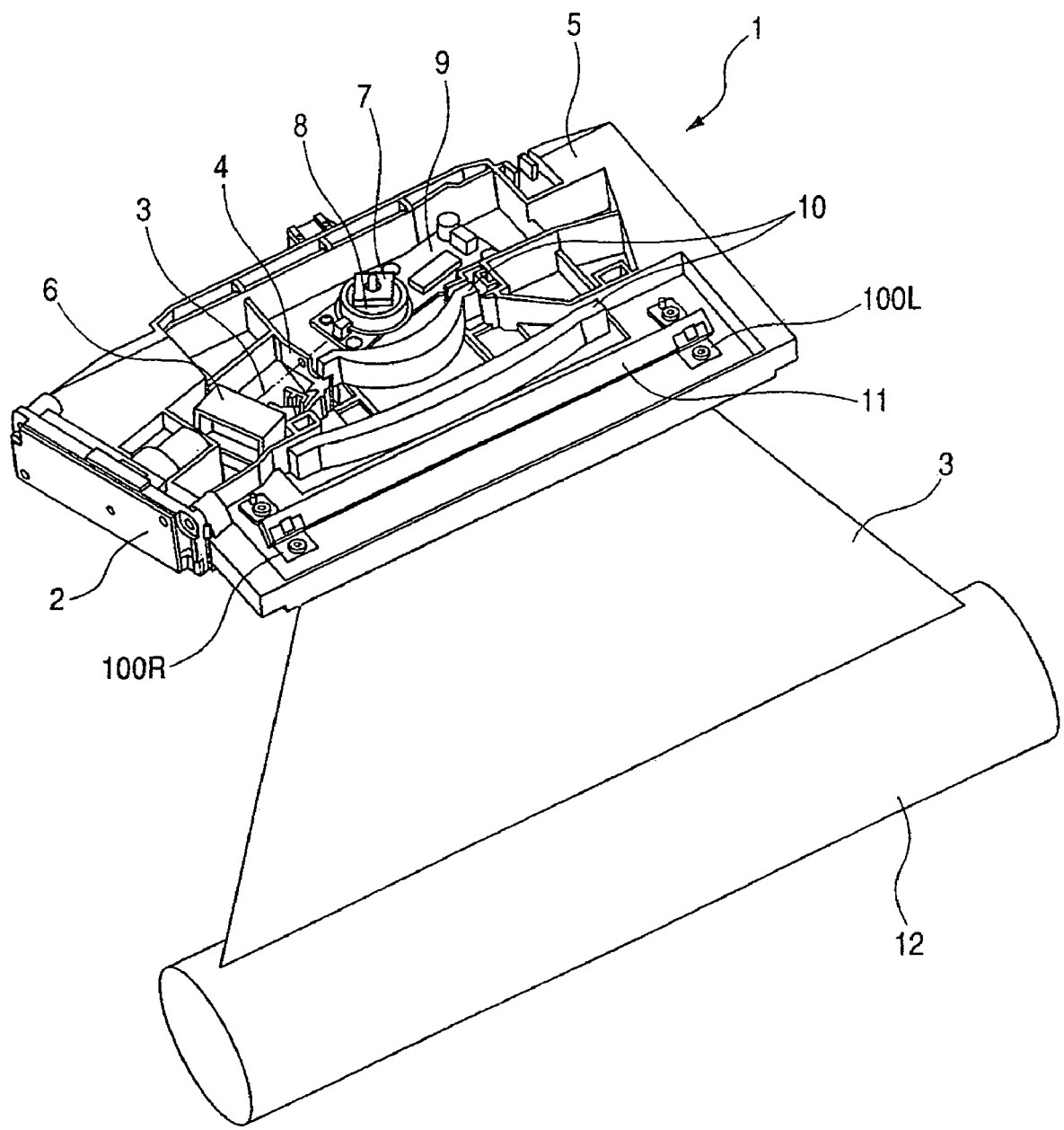
FIG. 11 is a perspective view of an optical scanning apparatus according to Embodiment 4 of the present invention.
Figure 12A:
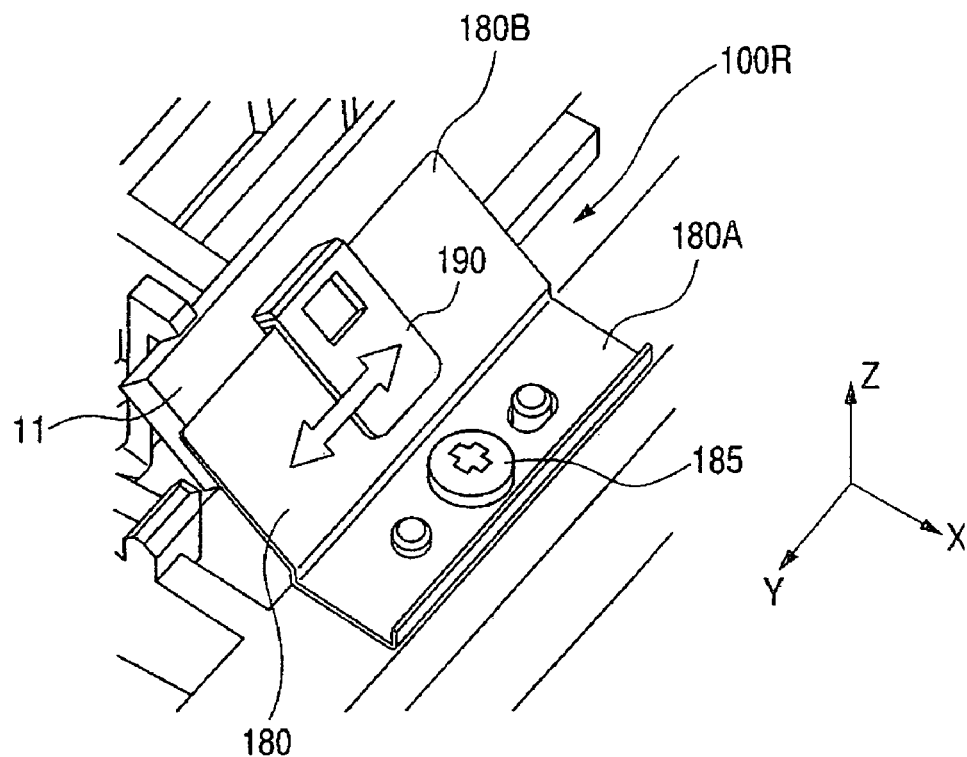
FIGS. 12A and 12B are a perspective view and a cross-sectional view, respectively, of a scanning line curvature correcting mechanism provided in the optical scanning apparatus according to Embodiment 4 of the present invention.
Figure 12B:
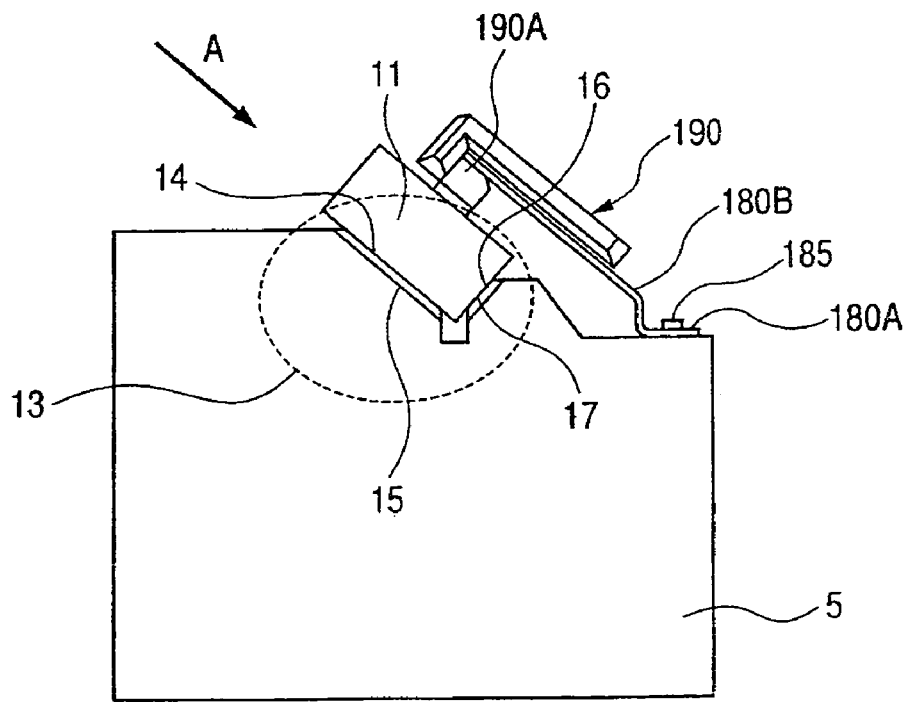

FIG. 11 is a perspective view of an optical scanning apparatus according to Embodiment 4, FIG. 12A is a perspective view of a scanning line curvature correcting mechanism 100R provided near one end portion of a mirror 11, and FIG. 12B is a cross-sectional view when FIG. 12A is seen from the direction indicated by the arrow Y. Members functionally similar to those in the aforedescribed embodiments are given the same reference numerals and need not be described again. Also, the structure of a scanning line curvature correcting mechanism 100L is the same as that of a scanning line curvature correcting mechanism 100R.

The optical scanning apparatus according to the present embodiment, as in Embodiments 1 to 3, are provided with scanning line curvature correcting mechanisms 100R and 100L near the opposite end portions of the mirror 11. The reflecting mirror 11 is disposed in the optical box 5 so that the main scanning direction in which the laser beam 3 is scanned may be longitudinal. The lower portion (a reflecting surface 14 and a surface 16 adjacent thereto) of the reflecting mirror 11 near the longitudinally opposite end portions thereof is placed on the mirror supporting member 13 (pedestals 15 and 17) which is a portion of the optical box 5 made of resin. On the other hand, the upper portion (a surface opposite to the reflecting surface 14) of the reflecting mirror 11 near the longitudinally opposite end portions thereof is held down by a leaf spring (pressure member) 180. This leaf spring 180 has a fixed portion 180A attached to the optical box 5 by a screw 185, and a spring portion 180B for imparting a force which presses the mirror. The spring portion 180B has mounted thereon a moving piece (piece portion) 190 slidable in the longitudinal direction of the mirror, and this moving piece 190 contacts with the surface opposite to the reflecting surface 14 of the mirror, and forms a pressure point (force point). On the other hand, the pedestal 15 provides a supporting point. The moving piece 190 is mounted on the spring portion 180B so as to sandwich the spring portion 180B from the opposite sides of the spring portion 180B. The leaf spring 180 is made of a metal, but the moving piece 190 is made of resin.

The moving piece 190 has a pressure portion 190A nipped between the spring portion 180B of the leaf spring 180 and the reflecting mirror 11, and the pressure force of the leaf spring 180 is transmitted to the reflecting mirror 11 through the pressure portion 190A. Also, the moving piece 190 is manually movable in the longitudinal direction of the reflecting mirror 11 while keeping a state in which the leaf spring 180 presses the reflecting mirror 11 (that is, without loosening the screw 185).

Figure 13A:
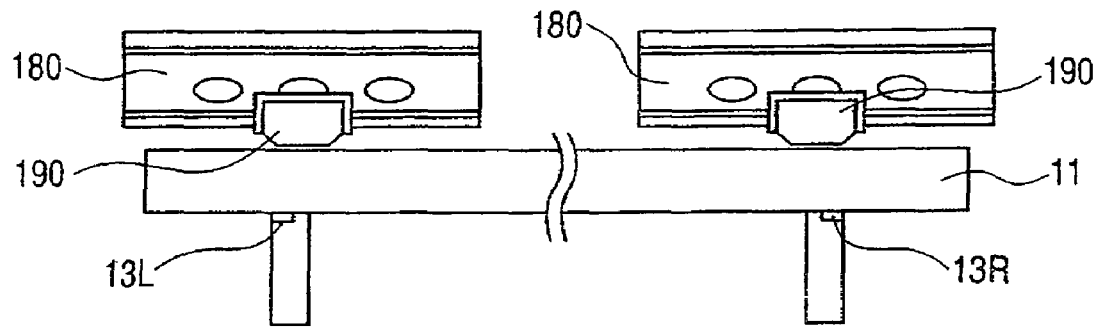
FIGS. 13A, 13B and 13C are typical views showing the curved state of a mirror when the moving piece of a pressure member has been moved.
Figure 13B:
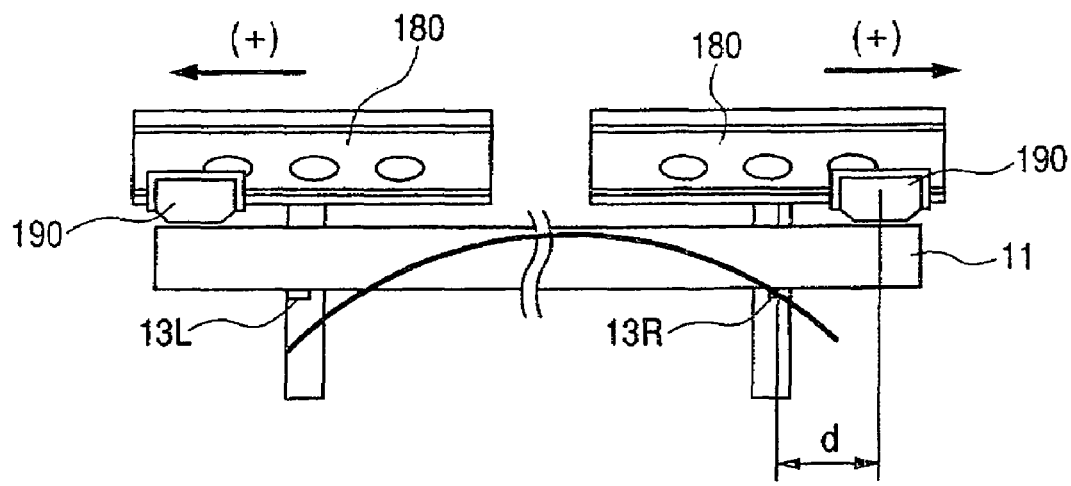
Figure 13C:
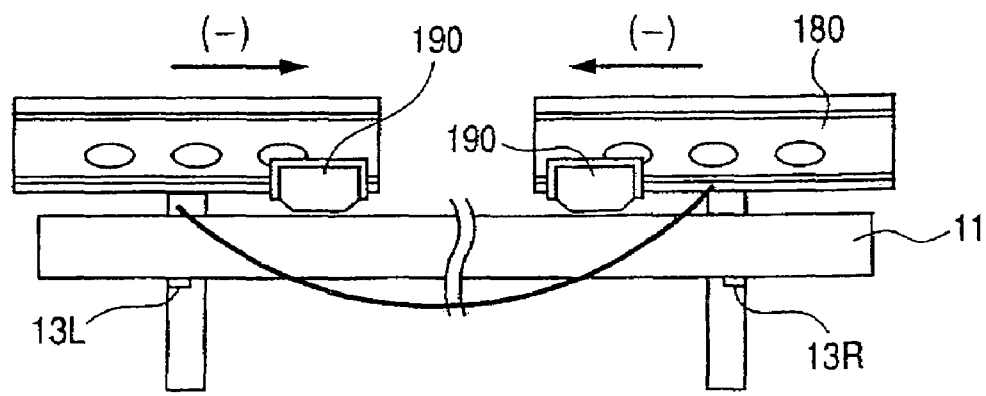

FIGS. 13A to 13C show the states of the deformation of the reflecting mirror 11 when the pressure position (pressure point) of the moving piece 190 has been moved in the longitudinal direction of the reflecting mirror 11. FIGS. 13A, 13B and 13C are typical views of the vicinity of the longitudinally opposite end portions of the mirror as it is seen in the direction indicated by the arrow A (FIG. 12B).

In FIG. 13A, two moving pieces 190 press positions overlapping left and right mirror supporting portions (supporting points) 13L and 13R in the longitudinal direction of the mirror. Therefore, the reflecting mirror receives little or no load, and maintains its substantially natural shape. In FIG. 13B, the moving pieces 190 press the outsides of the left and right mirror supporting portions 13L and 13R. Therefore, the reflecting mirror 11 is flexed into a convex shape. In FIG. 13C, the moving pieces 190 press the insides of the left and right mirror supporting portions 13L and 13R.

Therefore, the reflecting mirror 11 is flexed into a concave shape.

As described above, in the scanning line curvature correcting mechanism 100 in the present embodiment, as in Embodiments 1 to 3, the distance "d" in the longitudinal direction of the mirror between the supporting point by the support member 13 and the pressure point (force point) 190 by the pressure member 180 is adjustable. Also, the positions of the support members 13 are fixed, and the positions of the pressure points 190 are adjustable in the longitudinal direction of the mirror. Further, the moving pieces 190 of the pressure members are moved in the longitudinal direction of the mirror, whereby the positions of the pressure points are adjustable. Furthermore, the positions of the pressure points by the pressure members are movable beyond the positions of the supporting points by the support members with respect to the longitudinal direction of the mirror. Accordingly, the degree of freedom of the correction of the curvature of the scanning line is great, and the present embodiment can cope with both of a case where the shape of the scanning line before the correction of curvature is a concave shape and a case where it is a convex shape.

Further, in the present embodiment, when the curvature of the scanning line is to be corrected, the moving pieces 190 are manually movable in the longitudinal direction of the reflecting mirror 11 while the leaf spring 180 keeps a state in which it presses the reflecting mirror 11 (that is, without loosening the screw 185). Therefore, the curvature of the scanning line can be corrected easily. After the positions of the moving pieces 190 have been adjusted, the moving pieces maintain their positions after adjusted, by their frictional forces with the mirror 11.

Particularly, in a tandem type color image forming apparatus using a plurality of optical scanning apparatuses, it is important to suppress the degree of curvature of the scanning line of each color small, and in addition, to uniformize the directions of the convexness and concaveness of the curvature. If use is made of the optical scanning apparatus according to the present embodiment, the degree of curvature of the scanning line is small, and color misregister can also be suppressed.

The moving pieces may be fixed to the leaf spring by an adhesive agent or the like so that the moving pieces may not move after the curvature of the scanning line has been corrected.

Fifth Embodiment

Figure 14A:
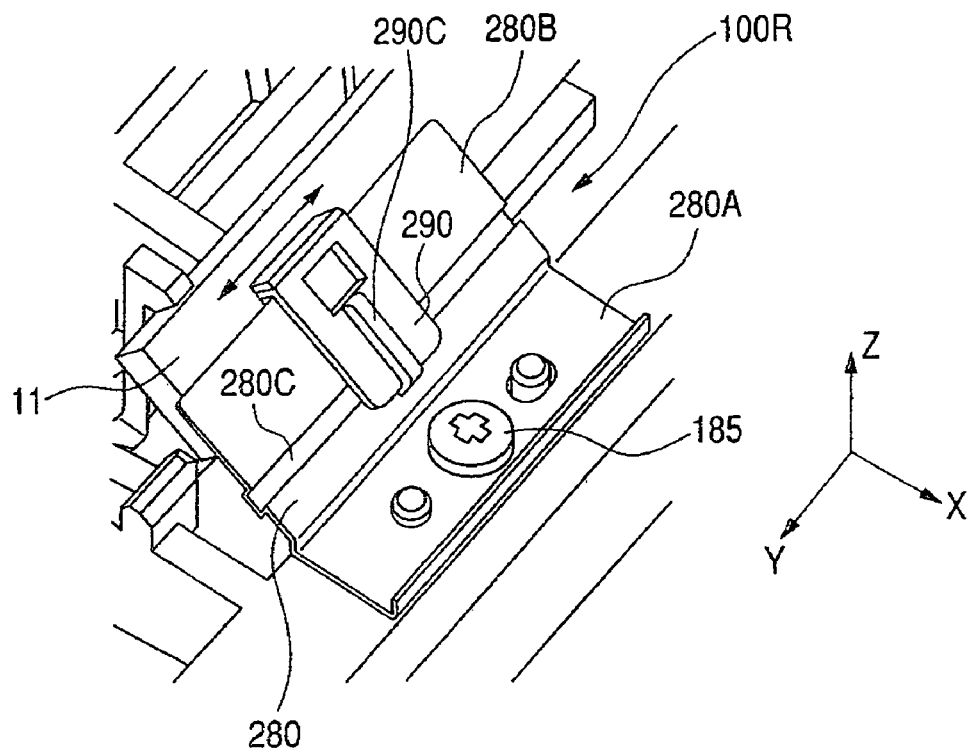
FIGS. 14A and 14B are a perspective view and a cross-sectional view, respectively, of a scanning line curvature correcting mechanism provided in an optical scanning apparatus according to Embodiment 5 of the present invention.
Figure 14B:
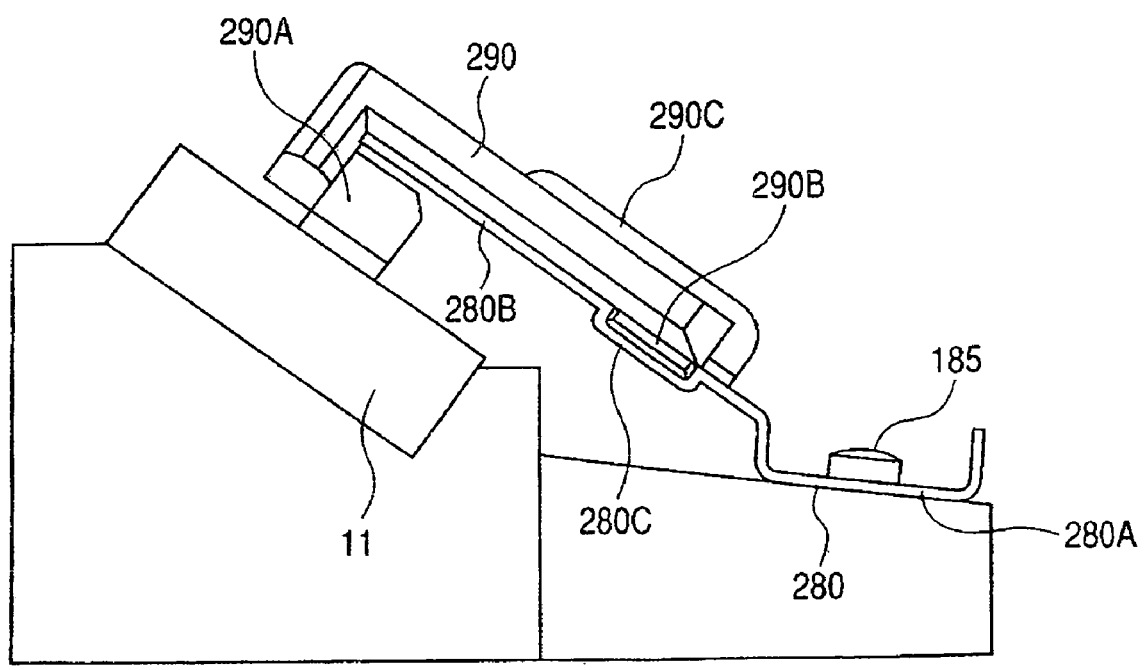

FIGS. 14A and 14B are cross-sectional views of a scanning line curvature correcting mechanism provided in an optical scanning apparatus according to a fifth embodiment. FIGS. 14A and 14B show the vicinity of one longitudinal end portion of the mirror, and a scanning line curvature correcting mechanism similar to that of FIGS. 14A and 14B exists near the other end portion but need not be described. The scanning line curvature correcting mechanism in the present embodiment is also such that the position of the pressure point by the pressure member (the position of a piece) is movable beyond the position of the supporting point by the mirror supporting member (pedestal) with respect to the longitudinal direction of the mirror, but in this point, the present embodiment is similar to Embodiments 1 to 4 and therefore, this need not be described.

As in Embodiment 4, the reflecting mirror 11 is first placed on the right and left mirror supporting portions 13R and 13L. Thereafter, the reflecting mirror 11 is pressed from above it and fixed by a leaf spring 280 and a moving piece 290. As in the aforedescribed embodiments, the leaf spring 280 is fixed to the optical box by a screw 185, and the moving piece 290 is movable in the longitudinal direction of the reflecting mirror 11. The moving piece 290 is moved, whereby the correction of the curvature of the scanning line can be effected.

The structure of the scanning line curvature correcting mechanism in the present embodiment will now be described with reference to FIGS. 14A and 14B. The upper portion (a surface opposite to the reflecting surface) of the reflecting mirror 11 near the longitudinally opposite end portions thereof is held down by the leaf spring (pressure member) 280. This leaf spring 280 has a fixed portion 280A attached to the optical box by the screw 185, and a spring portion 280B for imparting a force which presses the mirror. The spring portion 280B has mounted thereon the moving piece (piece portion) 290 slidable in the longitudinal direction of the mirror, and this moving piece 290 contacts with a surface opposite to the reflecting surface of the mirror, and forms a pressure point (force point). The moving piece 290 is mounted on the spring portion 280B so as to nip the spring portion 280B from the opposite sides of the spring portion 280B.

The moving piece 290 has a pressure portion 290A sandwiched between the spring portion 280B of the leaf spring 280 and the reflecting mirror 11, and the pressure force of the leaf spring 280 is transmitted to the reflecting mirror 11 through the pressure portion 290A. Also, the moving piece 290 is manually movable in the longitudinal direction of the reflecting mirror 11 while the leaf spring 280 keeps a state in which it presses the reflecting mirror 11 (that is, without loosening the screw 185). After the position of the moving piece 290 has been adjusted, the moving piece maintains its position after adjusted, by its frictional force with the mirror 11.

Also, the leaf spring 280 in the present embodiment is formed with a groove (guide portion) 280C for guiding the moving piece 290, along the longitudinal direction of the reflecting mirror 11. The moving piece 290 movably mounted on this leaf spring 280 has, besides the pressure portion 290A contacting with the mirror 11, a convex portion 290B fitted into the groove 280C in the leaf spring, and a handle 290C for gripping the moving piece 290 by fingers when the moving piece 290 is to be moved. The width (the length in a direction intersecting with the movement direction) of the convex portion 290B of the moving piece 290 is somewhat narrower than the width of the groove 280C in the leaf spring.

As described above, the moving piece 290 in the present embodiment has the handle 290C and therefore is very easy to move. Also, because of a construction in which the convex portion 290B of the moving piece 290 slides in the groove 280C in the leaf spring 280, the moving piece 290 can be smoothly moved to thereby make the correction of the curvature of the scanning line easier.

Sixth Embodiment

Figure 15:
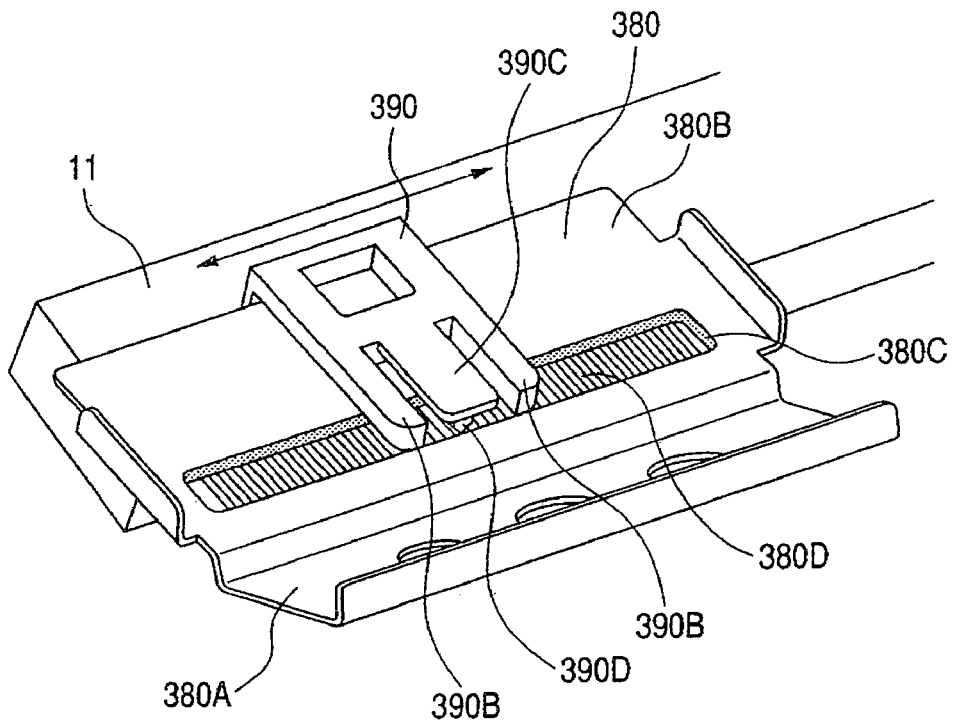
FIG. 15 is a perspective view of a scanning line curvature correcting mechanism provided in an optical scanning apparatus according to Embodiment 6 of the present invention.

FIG. 15 is a perspective view of a scanning line curvature correcting mechanism provided in an optical scanning apparatus according to a sixth embodiment. FIG. 15 shows the vicinity of one longitudinal end portion of the mirror, and a scanning line curvature correcting mechanism similar to that of FIG. 15 also exists near the other end portion, but need not be described. Again in the scanning line curvature correcting mechanism in the present embodiment, the position of the pressure point by the pressure member (the position of the piece) is movable beyond the position of the supporting point by the mirror supporting member (pedestal) with respect to the longitudinal direction of the mirror, but again in this point, the present embodiment is similar to Embodiments 1 to 5 and therefore need not be described.

As in Embodiment 4, the reflecting mirror 11 is, placed on the right and left mirror supporting portions 13R and 13L. Thereafter, the reflecting mirror 11 is pressed from above it and fixed by a leaf spring 380 and a moving piece 390. As in the aforedescribed embodiments, the leaf spring 380 is fixed to the optical box by a screw (not shown), and the moving piece 390 is movable in the longitudinal direction of the reflecting mirror 11. The moving piece 390 is moved, whereby the correction of the curvature of the scanning line can be effected.

As shown in FIG. 15, the leaf spring 380 in the present embodiment has a fixed portion 380A attached to the optical box by a screw (not shown), and a spring portion 380B for imparting a pressure which presses the mirror. The spring portion 380B has attached thereto the moving piece (piece portion) 390 slidable in the longitudinal direction of the mirror, and this moving piece 390 contacts with the surface opposite to the reflecting surface of the mirror, and forms a pressure point (force point). The moving piece 390 is mounted on the spring portion 380B so as to nip the spring portion 380B from the opposite sides of the spring portion 380B.

The moving piece 390 has a pressure portion (not shown) sandwiched between the spring portion 380B of the leaf spring 380 and the reflecting mirror 11, and the pressure force of the leaf spring 380 is transmitted to the reflecting mirror 11 through the pressure portion. Also, the moving piece 390 is manually movable in the longitudinal direction of the reflecting mirror 11 while the leaf spring keeps a state in which it presses the reflecting mirror 11 (that is, without loosening the screw).

The leaf spring 380 in the present embodiment is also formed with a groove 380C for guiding the moving piece 390, along the longitudinal direction of the reflecting mirror 11. The moving piece 390 movably mounted on the leaf spring 380 has, besides the pressure portion contacting with the mirror 11, two convex portions 390B fitted into the groove 380C in the leaf spring, and a resilient portion 390C provided between the two convex portions 390B. The moving piece 390 is made of resin, and the resilient portion 390C has flexibility relative to the main body of the moving piece 390, and has a pawl portion 390D at the distal end thereof. The width (the length in a direction intersecting with the movement direction) of the convex portions 390B of the moving piece 390 is somewhat narrower than the width of the groove 380C in the leaf spring.

Also, a rack portion 380D on which the pawl portion 390D of the moving piece 390 is restrained is provided on the bottom surface of the groove 380C in the leaf spring 380. This rack portion 380D is provided over the substantially entire area of the leaf spring 380 in the longitudinal direction of the reflecting mirror 11.

When the moving piece 390 is moved in the longitudinal direction of the mirror, the resilient portion 390C is flexed in accordance with the concavo-convex shape of the rack portion 380, and the pole portion 390D is moved while riding onto the mountains of the rack portion 380D. When the moving piece 390 is moved to a desired position, the pawl portion 390D is stopped in the concave portion of the rack portion 380D, and the position of the moving piece 390 is determined. That is, the pressure member in the present embodiment has a movement restricting mechanism for restricting the movement of the moving piece (piece portion).

As described above, provision is made of the movement restricting mechanism for restricting the movement of the moving piece (piece portion) and therefore, even if more or less shock is applied, the moving piece 390 can easily maintain its position after adjustment. Therefore, it becomes unnecessary to fix the moving piece 390 by an adhesive agent or the like after the correction of the curvature of the scanning line, and this leads to the saving of the trouble of assembling.

Figure 16:
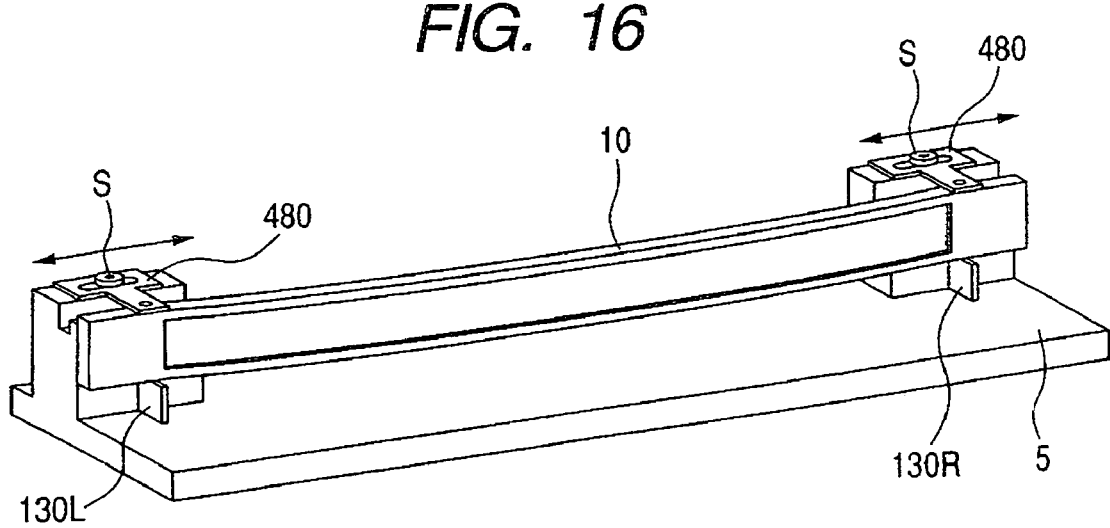
FIG. 16 is a perspective view showing an example in which scanning line curvature correcting mechanisms according to an embodiment of the present invention are mounted on the opposite end portions of an fθ lens.

In Embodiments 1 to 6 described above, the degree of curvature of the mirror is adjusted to thereby correct the curvature of the scanning line, but the optical element which is the object of adjustment may be an fθ lens. FIG. 16 shows an example in which scanning line curvature correcting mechanisms are provided near the longitudinally opposite end portions of an fθ lens 10. The scanning line curvature correcting mechanisms shown in FIG. 16 are of a type in which as in Embodiments 1 to 3, the positions of leaf springs (pressure members) 480 are adjusted in the main scanning direction (the direction indicated by the arrow), and the distance in the longitudinal direction (main scanning direction) of the lens between the supporting point by a support member 130R (130L) and the pressure point by the leaf spring 480 is adjustable. Instead of the scanning line curvature correcting mechanisms of the type in which the leaf springs 480 are moved, use may be made of the scanning line curvature correcting mechanisms of the type in which as in Embodiments 4 to 6, the moving pieces are used.

The present invention is not restricted to the above-described embodiments, but covers modifications within the technical idea thereof.

This application claims priorities from Japanese Patent Application No. 2004-221598 filed on Jul. 29, 2004 and Japanese Patent Application No. 2005-213310 filed on Jul. 22, 2005, which are incorporated herein by reference in their entirety.

What is claimed is:

1. An optical scanning apparatus comprising:
a deflector, which deflects a laser beam emitted from a light source to scan the laser beam on a scanned surface;
an optical element, which directs the laser beam deflected by said deflector to the scanned surface;
a support member, which supports a vicinity of an end portion of said optical element in a longitudinal direction of said optical element;
a pressure member, which cooperates with said support member to press said optical element on said support member, wherein a supporting point by said support member is fixed, and a pressure point by said pressure member is movable in the longitudinal direction; and
an adjusting mechanism, which slidably adjusts a distance in the longitudinal direction between the supporting point by said support member and the pressure point by said pressure member by sliding the pressure point by said pressure member along the longitudinal direction of said optical element in a state in which said pressure member presses said optical element.

2. An optical scanning apparatus according to claim 1, wherein a movable area of the pressure point by said pressure member covers both a side on which a center in the longitudinal direction of said optical element exists and a side on which an end in the longitudinal direction of said optical element exists, with the supporting point by said support member being a boundary of the both sides in the longitudinal direction of said optical element.

3. An optical scanning apparatus according to claim 1, wherein said pressure member has a spring portion, which imparts a force which presses said optical element, and a piece portion serving as said adjusting mechanism, which is slidably mounted on said spring portion and contacts with said optical element, and said piece portion is moved in the longitudinal direction, whereby the pressure point by said pressure member is slidable.

4. An optical scanning apparatus according to claim 3, wherein said pressure member further has a guide portion, which guides a movement of said piece portion.

5. An optical scanning apparatus according to claim 3, wherein said pressure member has a movement restricting mechanism, which restricts a movement of said piece portion.

6. An optical scanning apparatus according to claim 1, wherein the adjusting mechanism comprises an elongated hole provided in the pressure member and a screw, which fixes the pressure member.

7. An optical scanning apparatus according to claim 1, wherein said pressure member presses a plurality of surfaces of said optical element.

8. An optical scanning apparatus according to claim 7, wherein said pressure member is fixed at two different points in a direction intersecting with the longitudinal direction, so as to cooperate with said support member to encompass a portion of said optical element in the longitudinal direction of said optical element.

9. An optical scanning apparatus according to claim 1, further comprising an optical box, which contains said deflector, said optical element, said support member, said pressure member, and said adjusting mechanism, wherein said support member is a portion of said optical box.

10. An optical scanning apparatus according to claim 1, wherein said optical element is a mirror, which reflects the laser beam.

11. An optical scanning apparatus according to claim 1, wherein said optical element is a lens through which the laser beam is transmitted.

* * * * *